United States Patent
Kuno et al.

(10) Patent No.: US 11,168,033 B2
(45) Date of Patent: Nov. 9, 2021

(54) METHOD FOR DRYING COLUMNAR HONEYCOMB FORMED BODY AND METHOD FOR PRODUCING COLUMNAR HONEYCOMB STRUCTURE

(71) Applicant: NGK INSULATORS, LTD., Nagoya (JP)

(72) Inventors: Shuhei Kuno, Nagoya (JP); Hironori Takahashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 165 days.

(21) Appl. No.: 15/924,743

(22) Filed: Mar. 19, 2018

(65) Prior Publication Data
US 2018/0273434 A1 Sep. 27, 2018

(30) Foreign Application Priority Data

Mar. 24, 2017 (JP) .............................. JP2017-059922
Jan. 23, 2018 (JP) .............................. JP2018-009144

(51) Int. Cl.
*C04B 35/632* (2006.01)
*C04B 35/565* (2006.01)
(Continued)

(52) U.S. Cl.
CPC ...... *C04B 38/0006* (2013.01); *B01D 46/2455* (2013.01); *B28B 3/20* (2013.01);
(Continued)

(58) Field of Classification Search
CPC ... C04B 38/0006; C04B 2235/60; B28B 3/20; B28B 11/243; B28B 2003/203;
(Continued)

(56) References Cited

U.S. PATENT DOCUMENTS

| | | | |
|---|---|---|---|
| 5,263,263 A | 11/1993 | Gheorghiu et al. | |
| 5,953,832 A * | 9/1999 | Rosynsky | B28B 11/04 34/403 |

(Continued)

FOREIGN PATENT DOCUMENTS

| | | | | |
|---|---|---|---|---|
| CN | 104121769 | * | 11/2013 | .............. F26B 21/06 |
| EP | 1826517 A1 | * | 8/2007 | ........... C04B 35/565 |

(Continued)

OTHER PUBLICATIONS

JP-2001/130,973 (Kasai) Aug. 1991 (online machine translation), [Retrieved on Feb. 21, 2020], Retrieved from: Espacenet (Year: 1999).*

(Continued)

*Primary Examiner* — Alison L Hindenlang
*Assistant Examiner* — Andrés E. Behrens, Jr.
(74) *Attorney, Agent, or Firm* — Burr & Brown, PLLC

(57) ABSTRACT

A method for drying at least one unfired columnar honeycomb formed body comprising a raw material composition containing at least one raw material of ceramics, water and at least one heat-gelling binder, and cells defined by partition walls comprising flow paths from a first end surface to a second end surface. The method comprising drying the honeycomb formed body by passing hot gas satisfying $0.8 \leq T2/T1 \leq 3.3$, where T1 represents a gelation temperature of the binder (° C.) and T2 represents a wet-bulb temperature of the hot gas (° C.) through the flow paths from the first end surface and out the second end surface, while surrounding the honeycomb formed body with a correction mold to correct the shape of the honeycomb formed body during drying.

20 Claims, 17 Drawing Sheets

(51) Int. Cl.
  *C04B 35/638* (2006.01)
  *B28B 3/20* (2006.01)
  *F26B 21/10* (2006.01)
  *F26B 21/04* (2006.01)
  *C04B 38/00* (2006.01)
  *C04B 35/636* (2006.01)
  *B28B 11/24* (2006.01)
  *F26B 21/00* (2006.01)
  *F26B 21/02* (2006.01)
  *B01D 46/24* (2006.01)
  *F26B 3/04* (2006.01)
  *F26B 3/02* (2006.01)

(52) U.S. Cl.
  CPC .......... *B28B 11/243* (2013.01); *C04B 35/565* (2013.01); *C04B 35/632* (2013.01); *C04B 35/638* (2013.01); *C04B 35/6365* (2013.01); *F26B 3/04* (2013.01); *F26B 21/006* (2013.01); *F26B 21/028* (2013.01); *F26B 21/04* (2013.01); *F26B 21/10* (2013.01); *B28B 2003/203* (2013.01); *C04B 2235/5472* (2013.01); *C04B 2235/60* (2013.01); *C04B 2235/606* (2013.01); *C04B 2235/6021* (2013.01); *C04B 2235/77* (2013.01); *C04B 2235/94* (2013.01); *F26B 2210/02* (2013.01)

(58) Field of Classification Search
  CPC .... B28B 7/42; B28B 7/40; B28B 7/44; B28B 11/145; F27D 2005/0093
  See application file for complete search history.

(56) References Cited

U.S. PATENT DOCUMENTS

| | | | | |
|---|---|---|---|---|
| 8,407,915 B2* | 4/2013 | George | ................ | F26B 15/14 34/259 |
| 8,584,375 B2* | 11/2013 | Horiba | ................ | B28B 11/243 264/630 |
| 9,188,387 B2* | 11/2015 | Audinwood | ............ | F26B 3/347 |
| 2005/0115101 A1* | 6/2005 | Nate | ................... | C04B 40/0218 34/442 |
| 2008/0115383 A1 | 5/2008 | Nate et al. | | |
| 2009/0079111 A1* | 3/2009 | Kasai | ................... | B28B 11/248 264/489 |
| 2009/0320315 A1 | 12/2009 | Horiba et al. | | |
| 2010/0078859 A1* | 4/2010 | Takagi | ................ | B28B 11/241 264/432 |
| 2010/0219556 A1* | 9/2010 | Noni | ........................ | B28B 1/02 264/177.12 |
| 2010/0295218 A1* | 11/2010 | Dotzel | ................ | B01J 21/063 264/489 |
| 2010/0304033 A1* | 12/2010 | Allen | ..................... | B28B 11/04 427/425 |
| 2014/0007452 A1* | 1/2014 | Saito | ..................... | B28B 11/243 34/265 |
| 2015/0183692 A1* | 7/2015 | Malanga | ............... | C04B 35/185 501/82 |
| 2016/0355439 A1* | 12/2016 | McCandlish | ......... | C04B 14/043 |

FOREIGN PATENT DOCUMENTS

| | | | | |
|---|---|---|---|---|
| JP | H06-298563 A1 | | 10/1994 | |
| JP | 2001/130973 | * | 8/1999 | ........... C04B 35/565 |
| JP | 2000-044326 A1 | | 2/2000 | |
| JP | 2001-019533 A1 | | 1/2001 | |
| JP | 2001-130970 A1 | | 5/2001 | |
| JP | 2001-130973 A1 | | 5/2001 | |
| JP | 2003-285312 A1 | | 10/2003 | |
| JP | 2012-223920 A1 | | 11/2012 | |
| WO | 2008/117624 A1 | | 10/2008 | |

OTHER PUBLICATIONS

"Thermal Radiation." Thermal Radiation—Wikipedia, Feb. 22, 2017, web.archive.org/web/20170222021650/en.wikipedia.org/wiki/Thermal_radiation. (Year: 2017).*

CN104121769 (Yuhong) Nov. 2013 (online machine translation), [Retrieved on Jun. 10, 2020], Retrieved from: Espacenet (Year: 2013).*

* cited by examiner

[FIG. 1]
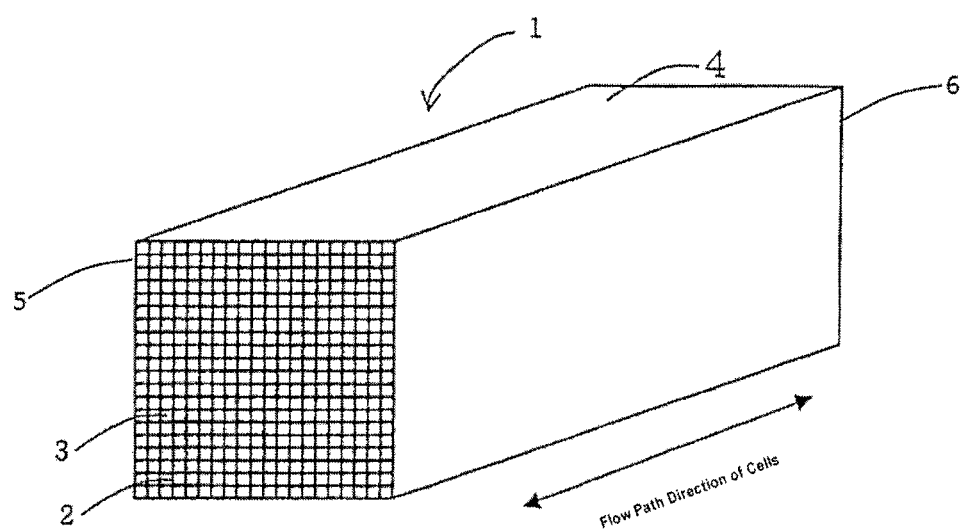

[FIG. 2]
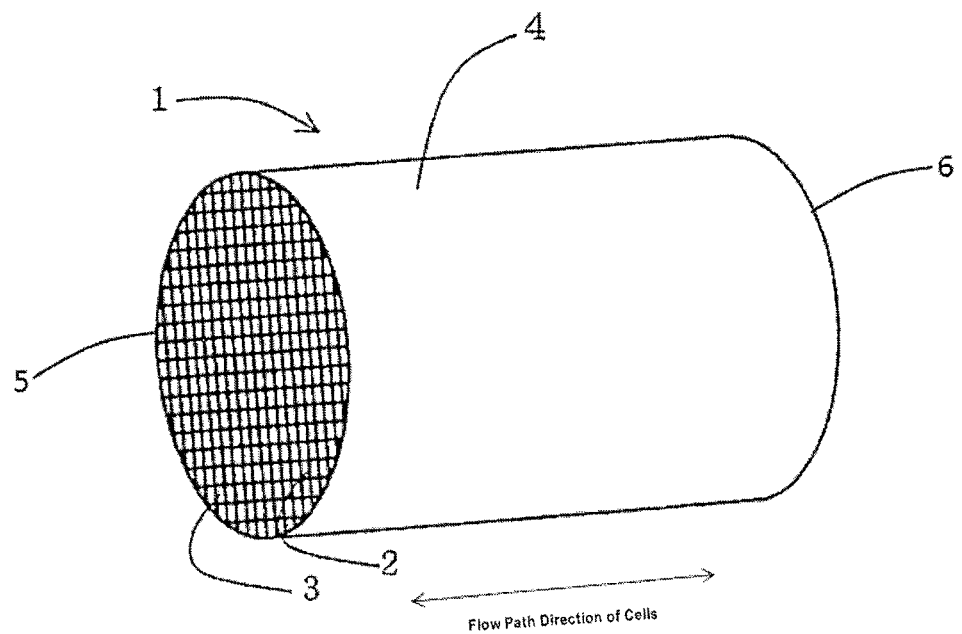

[FIG. 3]
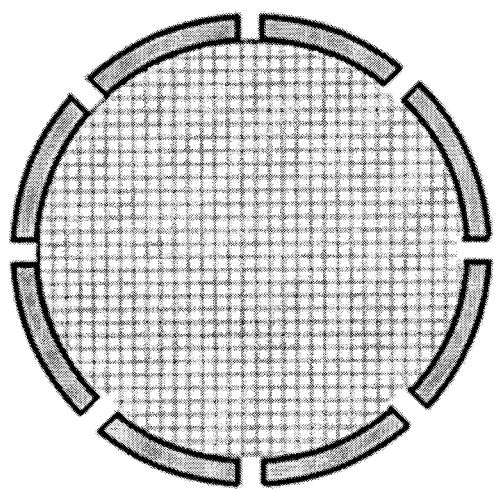

[FIG. 4]
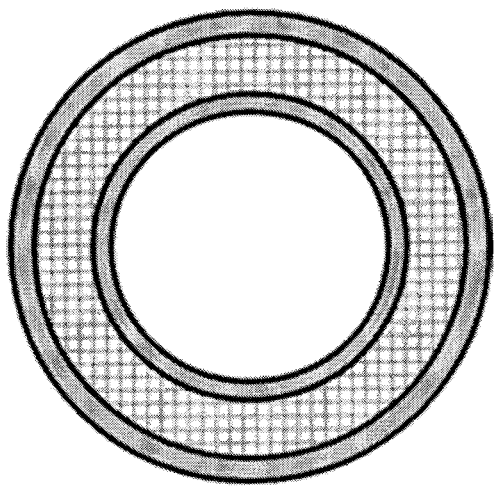

[FIG. 5]
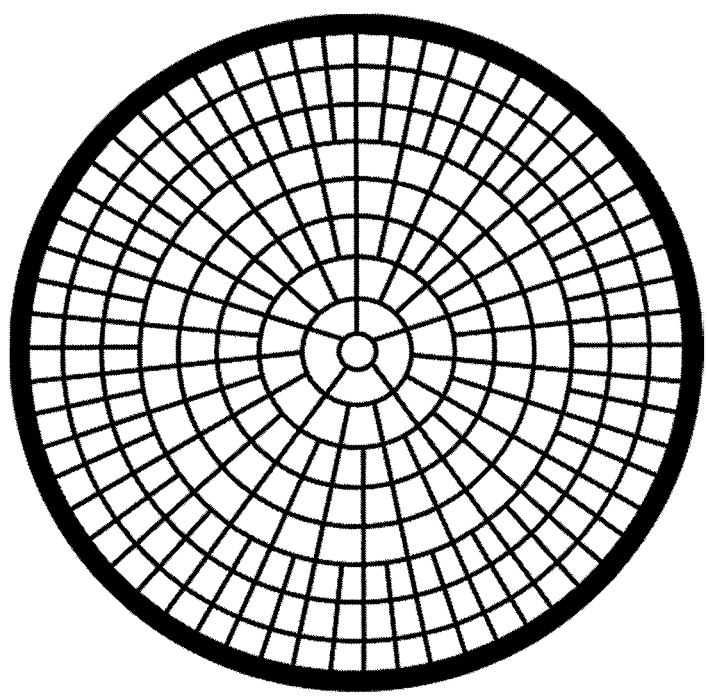

[FIG. 6]
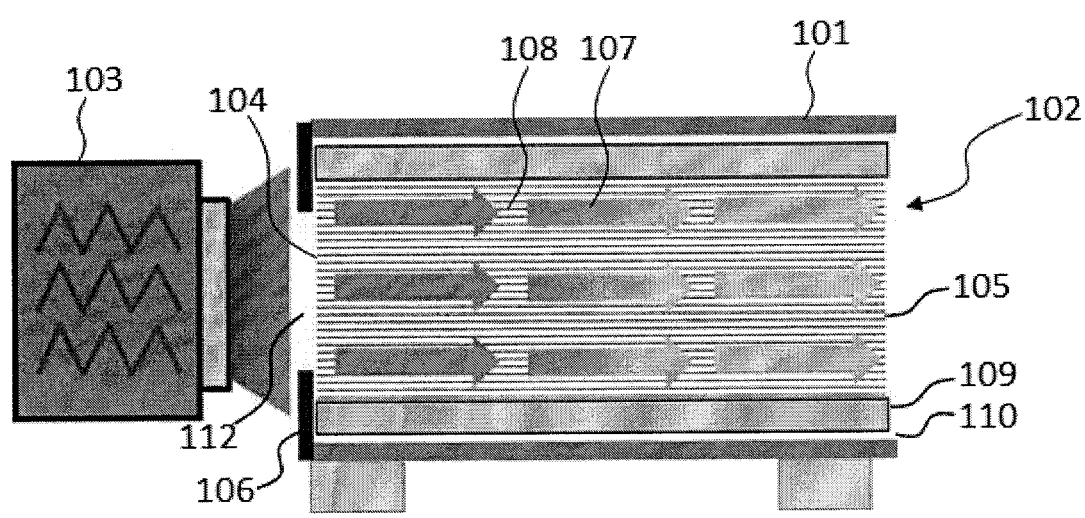

[FIG. 7]
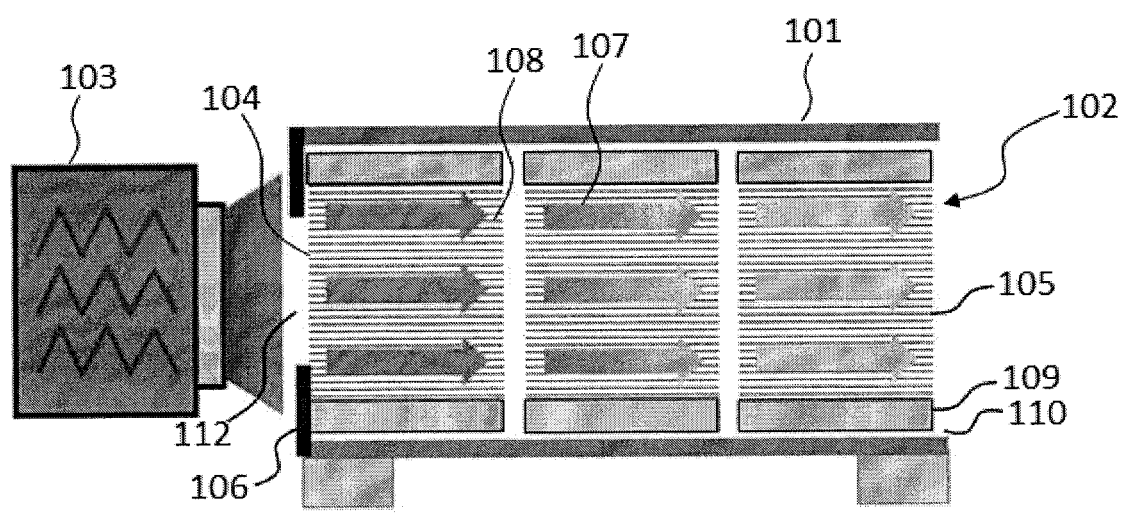

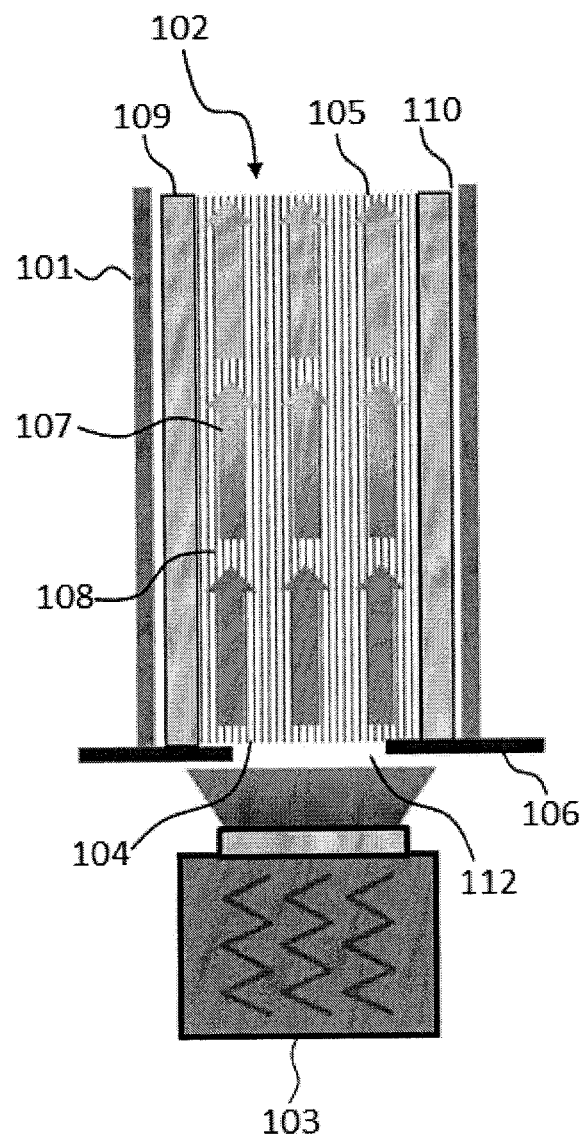
[FIG. 8]

[FIG. 9]
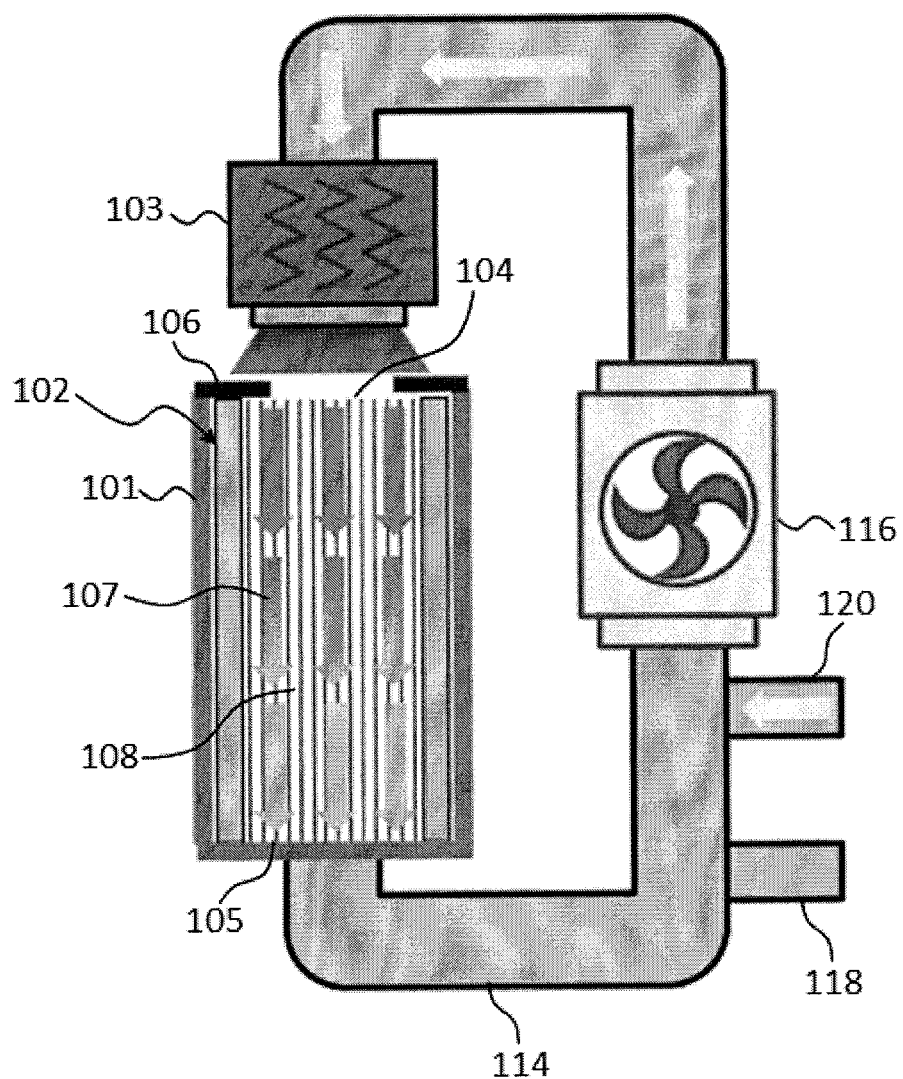

[FIG. 10]
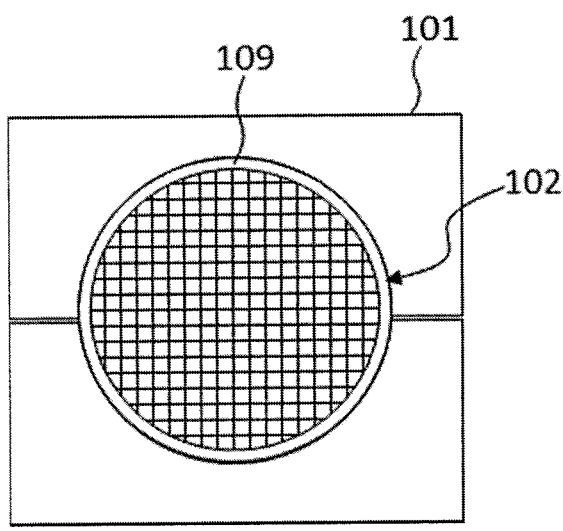

[FIG. 11]
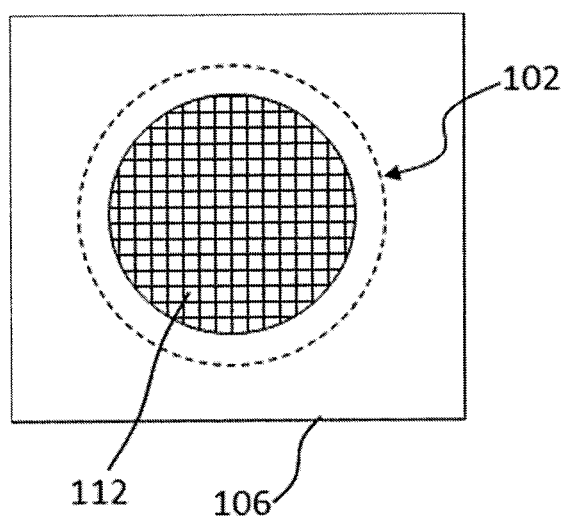

[FIG. 12]
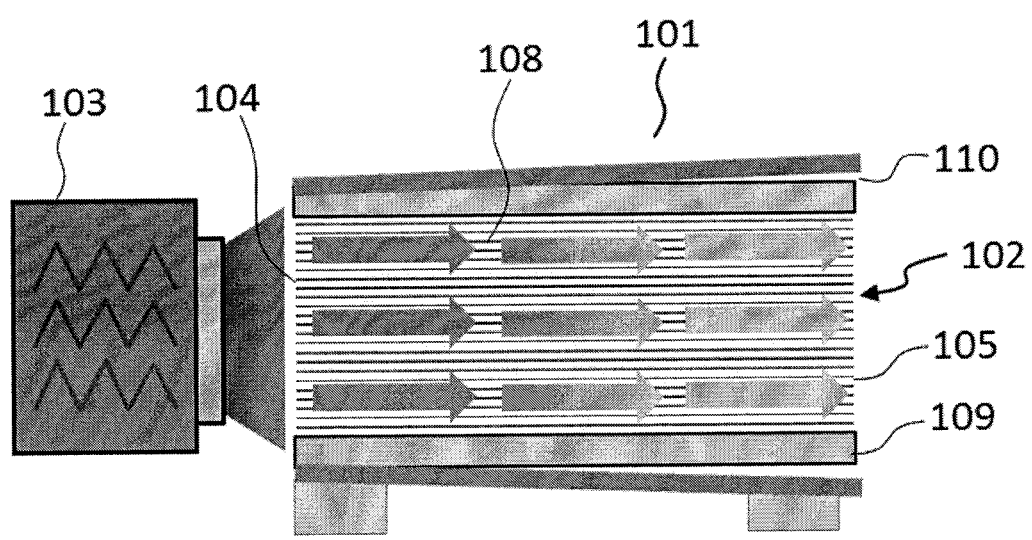

[FIG. 13]
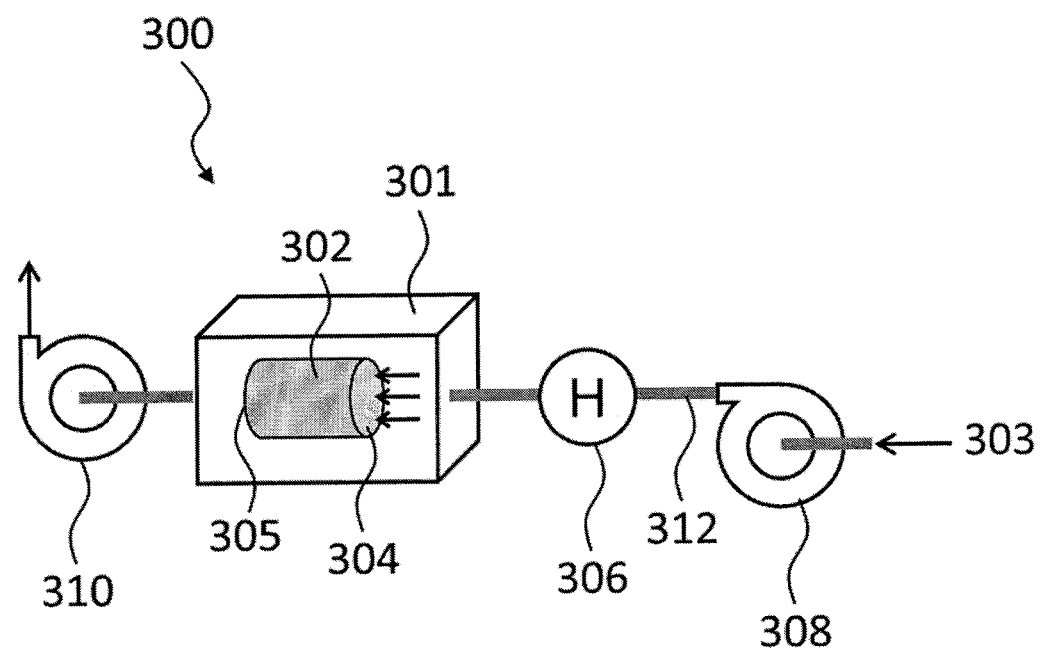

[FIG. 14]
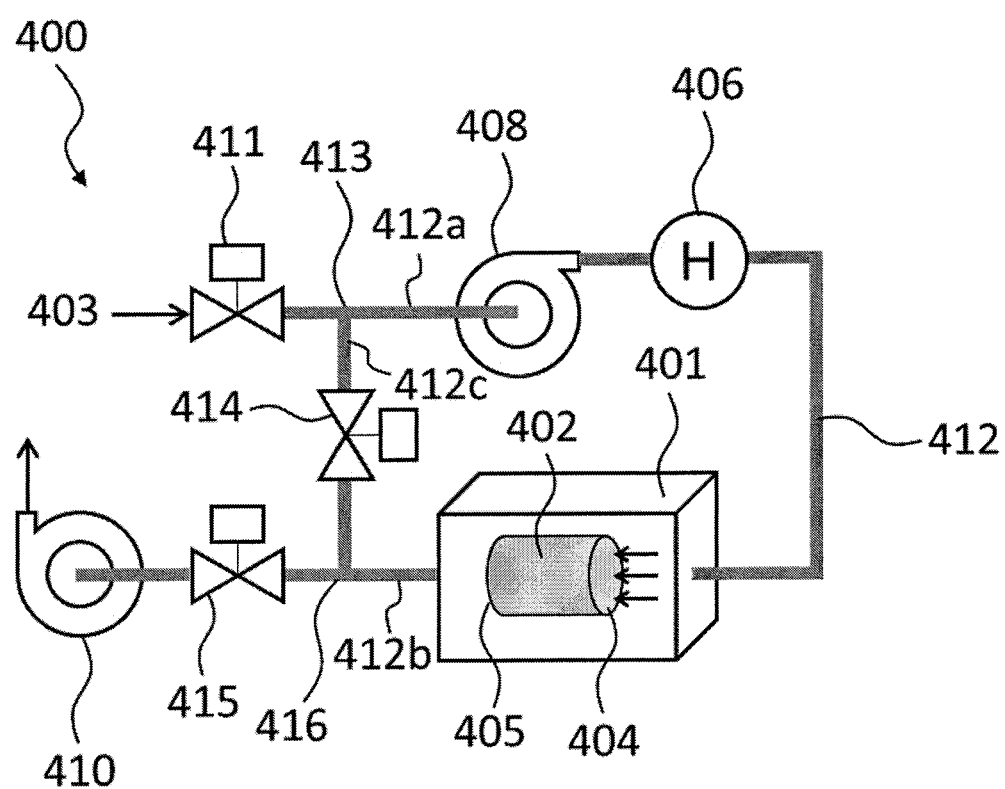

[FIG. 15]
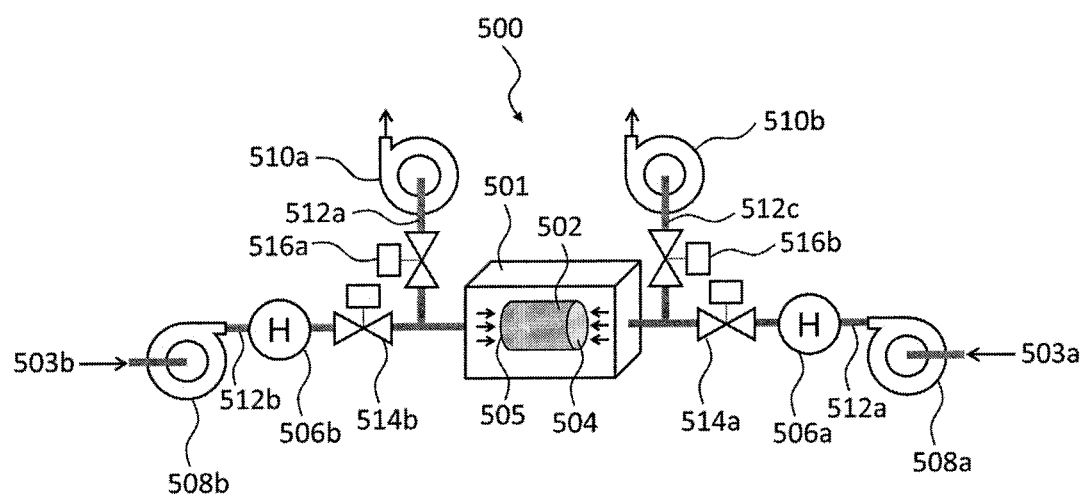

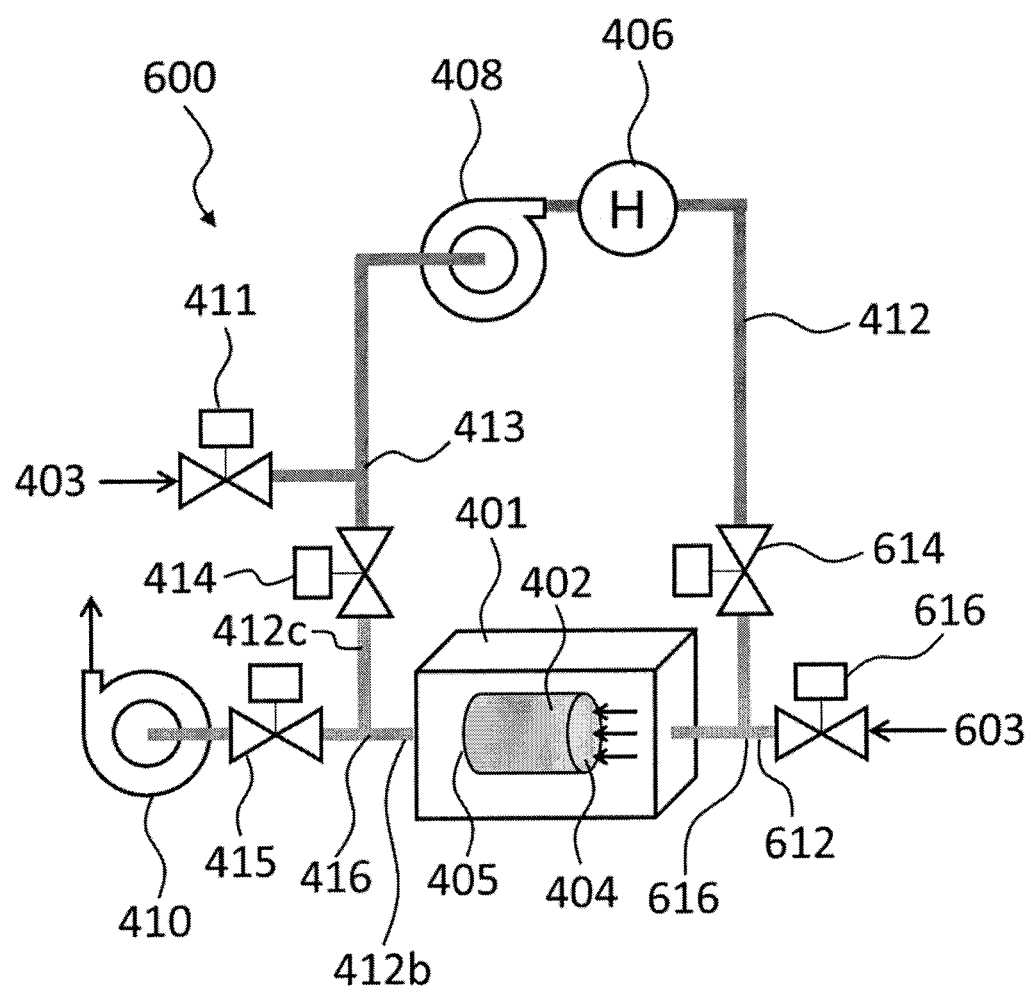
[FIG. 16]

[FIG. 17]
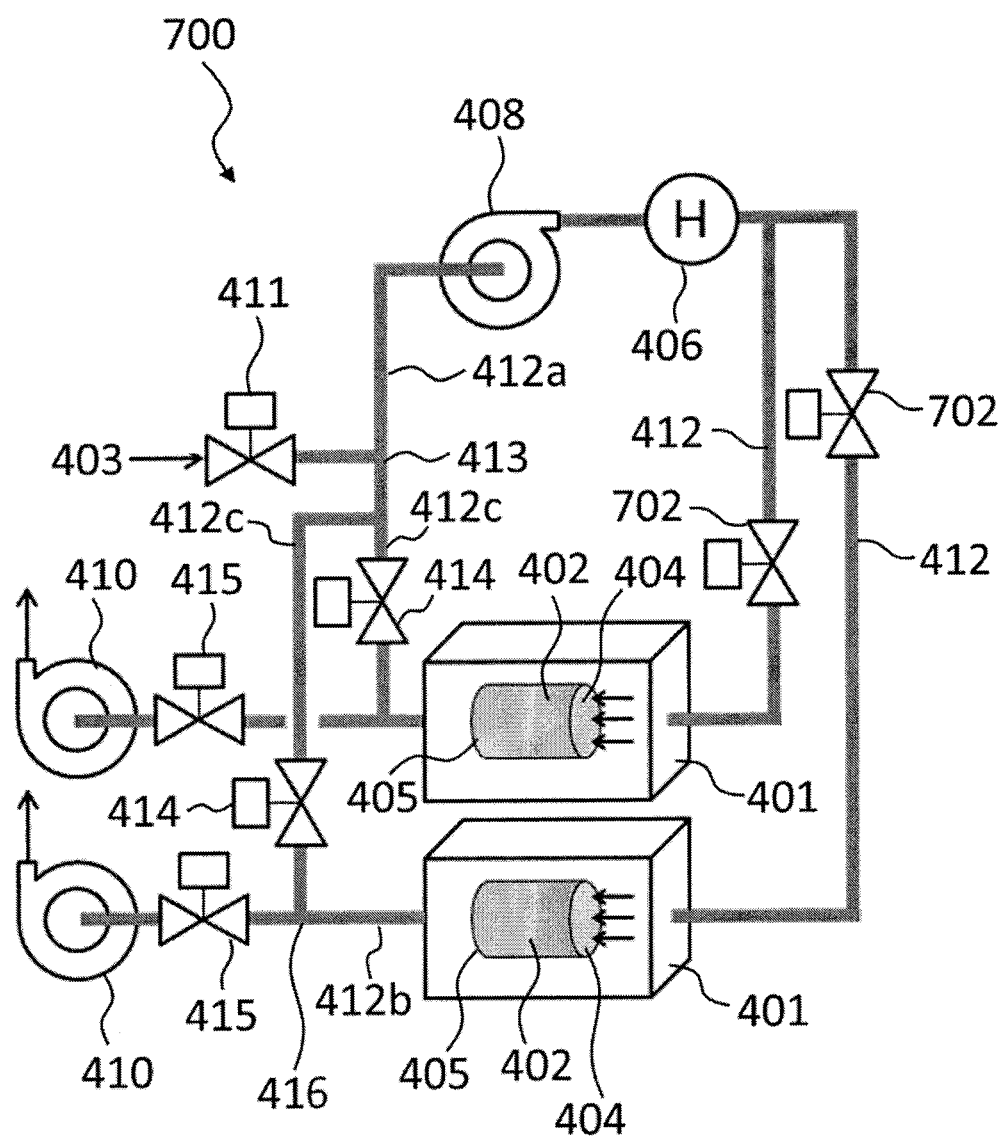

METHOD FOR DRYING COLUMNAR HONEYCOMB FORMED BODY AND METHOD FOR PRODUCING COLUMNAR HONEYCOMB STRUCTURE

TECHNICAL FIELD

The present invention relates to a method for drying a columnar honeycomb formed body. The present invention also relates to a method for producing a columnar honeycomb structure.

BACKGROUND ART

A structure made of ceramics having a honeycomb structure and formed by a plurality of cells serving as flow paths for fluid is used as a heat exchange member, a catalyst support, a filter, and the like. In general, such a honeycomb structure is produced by adding water and various additives to ceramics raw materials, kneading them, and then extruding the resulting mixture into a columnar honeycomb formed body, and then subjecting the columnar honeycomb formed body to a drying step and a firing step.

In the drying step of the honeycomb formed body, deformation such as bending or twisting tends to be generated in the honeycomb formed body. Further, the honeycomb formed body may be divided into a plurality of honeycomb structure segments, and these segments may be joined and integrated to form a certain structure. In such a case, if deformation such as bending or twisting is generated in each segment, a problem of difficulty of joining will be caused. For this reason, various methods have been conventionally proposed as methods for suppressing deformation during drying.

Japanese Patent Application Publication No. H06-298563 A discloses a method for drying a honeycomb structure by positioning the honeycomb structure in parallel to a pair of dielectric electrodes on a table such that the central axis of rotation of the turntable coincides with the longitudinal axis of the honeycomb structure, and in this state, carrying out dielectric drying of the honeycomb structure while rotating the honeycomb body.

Japanese Patent Application publication No. 2000-044326 A discloses a method for drying a ceramic formed body by blowing hot air into through holes of the ceramic formed body while irradiating the ceramic formed body with microwaves.

Japanese Patent Application Publication No. 2001-130970 A discloses a drying method including the combination of a microwave drying step of drying a ceramic formed body by microwaves with hot air drying step of further drying the formed body dried by microwaves using hot air.

Japanese Patent Application Publication No. 2012-223920 A discloses a method for drying a silicon carbide-based formed body by wrapping the formed body with a resin wrap so as not to be exposed, maintaining the wrapped formed body at 50 to 70° C. to equalize a temperature of the entire formed body, and then holding the formed body by a dry correction tool, and further maintaining the entire formed body at 50 to 70° C.

WO 2008/117624 A1 discloses a method for drying a honeycomb formed body by allowing superheated steam or a mixed gas of steam and heated air to pass through the cells, where the superheated steam or the mixed gas has a regulated temperature and humidity so as to realize a wet-bulb temperature of 70° C. or higher.

Japanese Patent Application Publication No. 2003-285312 A discloses a method for drying a honeycomb formed body, characterized in that the method comprises a drying step starting in a state where at least a part of the outer sidewall is covered with a guide that is in contact with the outer sidewall or not in contact with the outer sidewall. The patent document discloses that pressure from the guide to the outer sidewall is preferably less than 0.2 MPa where the guide comes into contact with the outer sidewall in the drying step, and that the drying preferably includes the combination of microwave drying and hot air drying.

Japanese Patent Application Publication No. 2001-130973 A discloses a method for drying a ceramic formed body by microwaves and further drying the formed body by hot air, comprising surrounding the ceramic formed body by means of drying tools comprised of a upper tool and a lower tool so as to bring the ceramic formed body into close contact with the upper tool and the lower tool, and drying the ceramic formed body while applying a pressure of 0.4 to 0.6 MPa to the ceramic formed body.

Japanese Patent Application Publication No. 2001-19533 A discloses a method for drying a ceramic formed body by irradiating the ceramic formed body with microwaves while closely surrounding substantially the entire side surface parallel to the longitudinal direction of the ceramic formed body having a honeycomb structure by a drying tool comprised of two separate tools.

CITATION LIST

Patent Literatures

Patent Document 1: Japanese Patent Application Publication No. H06-298563 A

Patent Document 2: Japanese Patent Application Publication No. 2000-044326 A

Patent Document 3: Japanese Patent Application Publication No. 2001-130970 A

Patent Document 4: Japanese Patent Application Publication No. 2012-223920 A

Patent Document 5: WO 2008/117624 A1

Patent Document 6: Japanese Patent Application Publication No. 2003-285312 A

Patent Document 7: Japanese Patent Application Publication No. 2001-130973 A

Patent Document 8: Japanese Patent Application Publication No. 2001-19533 A

SUMMARY OF INVENTION

Technical Problem

The columnar honeycomb formed body for use in the heat exchange member is required to have a high thermal conductivity in terms of heat exchange performance and high strength in terms of endurance reliability. Thus, these properties are achieved by controlling an internal porosity at a level of substantially zero by Si impregnation and firing. On the other hand, the porosity after Si impregnation is determined depending on the porosity of the ceramics member (the porosity of the dried body) before impregnation, an amount of thermal expansion during Si impregnation, and an amount of impregnated Si. Therefore, the drying step will require a drying method of providing uniform porosity in the dried body.

However, the columnar honeycomb formed body for use in the heat exchanging member has a thicker outer sidewall (e.g., 1.5 mm or more) than a columnar honeycomb formed body for other purposes. Therefore, with the prior art drying approaches that utilize electromagnetic waves (microwave drying and dielectric drying), electromagnetic waves are liable to be absorbed only in the outer sidewall, resulting in a slower drying rate. Further, the drying approaches as described above result in prolonged drying time as well as a difference in shrinkage due to a difference in drying rate between the outer sidewall and the inside, leading to variation in the inner porosity as well as deterioration of dimensional accuracy (e.g., deterioration of circularity, and increased variation in the diameter). Furthermore, the columnar honeycomb formed body for use in the heat exchange member causes a problem that a difference in the drying rate in the longitudinal direction is liable to occur, resulting in bending, because the columnar honeycomb formed body has a larger ratio (L/D) of a length in the flow path direction of the cells to a length in the direction perpendicular to the flow path direction of the cells (L/D=2 to 5).

One of the prior art documents also proposes the method for suppressing deformation by bringing the honeycomb formed body into contact with the drying tool, in addition to by irradiating the honeycomb formed body with microwaves during the drying. However, the above problems cannot be solved yet.

One of the prior art documents proposes the method for drying the silicon carbide-based formed body by wrapping the formed body with the resin wrap so as not to be exposed, maintaining the wrapped formed body at 50 to 70° C. to equalize the temperature of the entire formed body, and then holding the formed body by the dry correction tool, and further maintaining the entire formed body at 50 to 70° C. However, the method arises a problem of very prolonged drying time. Further, the method also requires equalization of the temperature of the entire molded body by using the resin wrap, thereby causing a problem that it takes time and effort in the drying step.

One of the prior art documents also proposes the method for drying the honeycomb formed body by allowing superheated steam or a mixed gas of steam and hot air to pass through the cells, where the superheated steam or the mixed gas has a temperature and humidity regulated so as to realize the wet-bulb temperature of 70° C. or higher. However, there is still room for improvement in terms of uniformity of porosity and prevention of deformation.

The present invention has been made to solve the above problems. One of objects of the present invention is to provide a method for drying a columnar honeycomb formed body, which can dry the columnar honeycomb body in a short time while suppressing deformation and variation in porosity. Another object of the present invention is to provide a method for producing a columnar honeycomb structure using such a drying method.

Solution to Problem

As a result of extensive studies to solve the above problems, the present inventors have found that it is effective to rapidly drying the columnar honeycomb formed body by allowing hot gas to directly pass through the cells of the columnar honeycomb formed body without carrying out the drying by irradiating the columnar honeycomb formed body with electromagnetic waves, while housing the columnar honeycomb formed body before drying in a correction mold to suppress deformation of the columnar honeycomb formed body during drying.

By allowing hot gas to directly pass through the cells of the columnar honeycomb formed body, a difference in drying rate in the direction perpendicular to the flow paths of the cells is reduced, as well as a difference in drying rate in the flow direction of the cells is also reduced, so that the columnar honeycomb structure will be resistant to deformation. Also, as the drying proceeds from the inside, the columnar honeycomb formed body can be dried in a short time. The present inventors have found that by raising a wet-bulb temperature of the hot gas to nearly a gelation temperature of a binder contained in the ceramics so that it becomes highly humid, gelation of the binder is promoted and the strength is increased, thereby suppressing the drying shrinkage during drying and allowing the corrected state to be easily maintained. The present invention has been completed on the basis of such findings and is exemplified as follows.

In one aspect, the present invention provides:

a method for drying at least one unfired columnar honeycomb formed body, the honeycomb formed body comprising a raw material composition containing at least one raw material of ceramics, water and at least one heat-gelling binder, and comprising a plurality of cells comprising flow paths penetrating from a first bottom surface to a second bottom surface inside an outer sidewall, the cells being defined by partition walls, the method comprising a step of drying the honeycomb formed body by allowing hot gas satisfying $0.8 \leq T2/T1 \leq 3.3$ in which T1 represents a gelation temperature of the binder (° C.) and T2 represents a wet-bulb temperature of hot gas (° C.), to pass through the flow paths of the plurality of cells such that the hot gas flows into the first bottom surface and flows out of the second bottom surface, while surrounding an outer side surface of the honeycomb formed body by a correction mold comprising an inner side surface shape corresponding to the outer side surface shape of the honeycomb formed body, wherein during the step of drying the honeycomb formed body, at least a part of the outer side surface of the honeycomb formed body receives pressure from the inner side surface of the correction mold, whereby the honeycomb formed body is subjected to shape correction.

In one embodiment of the method for drying the at least one unfired columnar honeycomb formed body according to the present invention, $T1 \leq T3$ is satisfied, in which T3 represents a dry-bulb temperature of hot gas (° C.), and T3 is lower than an initiation temperature of thermal decomposition of the binder.

In another embodiment of the method for drying the at least one unfired columnar honeycomb formed body according to the present invention, the method comprises carrying out the step of drying the honeycomb formed body while surrounding the outer side surface of the honeycomb formed body by the correction mold such that a ratio of an inner cross-sectional area S1 of the honeycomb formed body before carrying out the step of drying in a direction perpendicular to a flow path direction of the cells to an inner cross-sectional area S2 of the correction mold in the direction perpendicular to the flow path direction of the cells is $0.96 \leq S1/S2 \leq 1.04$.

In yet another embodiment of the method for drying the at least one unfired columnar honeycomb formed body according to the present invention, the method comprises carrying out the step of drying the honeycomb formed body such that the hot gas passes through the flow paths of the cells at a gas velocity of 2.0 m/s or more.

In yet another embodiment of the method for drying the at least one unfired columnar honeycomb formed body according to the present invention, the method comprises carrying out the step of drying the honeycomb formed body while disposing on an upstream side of the first bottom surface a baffle plate for preventing the hot gas from entering a boundary portion between the outer side surface of the honeycomb formed body and the inner side surface of the correction mold.

In yet another embodiment of the method for drying the at least one unfired columnar honeycomb formed body according to the present invention, the baffle plate is arranged on the upstream side of the first bottom surface such that the baffle plate covers the outer sidewall of the honeycomb formed body, the boundary portion between the outer side surface of the honeycomb formed body and the inner side surface of the correction mold, and 5 to 30% of a number of all the cells from the cells arranged on an outermost periphery toward the cells on the inner side.

In yet another embodiment of the method for drying the at least one unfired columnar honeycomb formed body according to the present invention, a water content in the raw material composition is from 17.0% by mass to 26.0% by mass, based on 100% by mass of the at least one raw material of ceramics.

In yet another embodiment of the method for drying the at least one unfired columnar honeycomb formed body according to the present invention, the method comprising carrying out the step of drying the honeycomb formed body such that a water content in a dried honeycomb formed body is 0.07 g or less per 1 g of the dried honeycomb formed body.

In yet another embodiment of the method for drying the at least one unfired columnar honeycomb formed body according to the present invention, a relationship of L/D≤15 is satisfied, in which L represents a length of the honeycomb formed body in a flow path direction of the cells, and D represents a length of the honeycomb formed body in a direction perpendicular to the flow path direction of the cells.

In yet another embodiment of the method for drying the at least one unfired columnar honeycomb formed body according to the present invention, the outer sidewall of the honeycomb formed body has a thickness of 0.2 mm or more.

In yet another embodiment of the method for drying the at least one unfired columnar honeycomb formed body according to the present invention, the correction mold is configured of a pair of half members that are divided along a flow path direction of the cells.

In yet another embodiment of the method for drying the at least one unfired columnar honeycomb formed body according to the present invention, an inner cross-sectional area S2 of the correction mold in a direction perpendicular to a flow path direction of the cells is increased from a first bottom surface side toward a second bottom surface side.

In yet another embodiment of the method for drying the at least one unfired columnar honeycomb formed body according to the present invention, the step of drying the honeycomb formed body comprises allowing the hot gas to pass through the flow paths of the plurality of cells maintained in a negative pressure state.

In yet another embodiment of the method for drying the at least one unfired columnar honeycomb formed body according to the present invention, in the drying step of drying the honeycomb formed body, a gas volume of the hot gas flowing out of the second bottom surface of the honeycomb formed body is higher than a gas volume of the hot gas flowing into the first bottom surface of the honeycomb formed body.

In yet another embodiment of the method for drying the at least one unfired columnar honeycomb formed body according to the present invention, the step of drying the honeycomb formed body comprises circulating at least a part of the hot gas flowing out of the second bottom surface of the honeycomb formed body to utilize the hot gas as a part or all of the hot gas flowing into the first bottom surface of the honeycomb formed body.

In still another embodiment of the method for drying the at least one unfired columnar honeycomb formed body according to the present invention, the hot gas is generated by heating a drying gas supplied by a blowing fan with a heater, a path of the hot gas flowing out of the second bottom surface of the honeycomb formed body is in communication with a path of the drying gas at a confluence on an upstream side of the blowing fan via a circulation path, and valves are arranged in the path of the drying gas and in the path of the hot gas flowing out of the second bottom surface of the honeycomb formed body, respectively.

In yet another embodiment of the method for drying the at least one unfired columnar honeycomb formed body according to the present invention, the method comprises, during the step of drying the honeycomb formed body, reversing a direction of allowing the hot gas to pass through the flow paths of the plurality of cells such that the hot gas flows into the second bottom surface and flows out of the first bottom surface.

In yet another embodiment of the method for drying the at least one unfired columnar honeycomb formed body according to the present invention, the method further comprises, after the step of drying the honeycomb formed body, a step of cooling the honeycomb formed body by allowing cold gas in place of the hot gas to pass through the flow paths of the plurality of the cells, such that the cold gas flows into the first bottom surface and flows out of the second bottom surface.

In yet another embodiment of the method for drying the at least one unfired columnar honeycomb formed body according to the present invention, the step of cooling the honeycomb formed body comprises carrying out the step of cooling while closing a valve arranged in a path of the hot gas flowing into the first bottom surface of the honeycomb formed body and opening a valve arranged in a path of the cold gas flowing into the first bottom surface of the honeycomb formed body.

In still another embodiment of the method for drying the at least one unfired columnar honeycomb formed body according to the present invention, a path of the hot gas is branched into a plurality of branched paths that are in communication with the first bottom surfaces of a plurality of the honeycomb formed bodies, and the method comprises switching the hot gas flowing into the first bottom surfaces of the plurality of the honeycomb formed bodies by an opening and closing operation of valves arranged in each of the branched paths of the hot gas.

In another aspect, the present invention provides:

a method for producing a honeycomb structure made of ceramics, comprising:

kneading raw materials containing at least one raw material of ceramics, water, and at least one heat-gelling binder to obtain a mixture;

extruding the mixture to obtain an unfired columnar honeycomb formed body comprising
a plurality of cells comprising flow paths penetrating from a first bottom surface to a second bottom surface in an inside of an outer sidewall, the cells being defined by partition walls;
subjecting the unfired columnar honeycomb formed body to the method for drying the at least one honeycomb formed body according to any one of claims 1 to 20 to obtain a dried honeycomb formed body; and
firing the dried honeycomb formed body.

Advantageous Effects of Invention

According to the present invention, the at least one columnar honeycomb formed body can be dried in a short time while suppressing the deformation and the variation in the porosity. Therefore, the present invention will contribute to improvement of the productivity and improvement of the stability of quality of the columnar honeycomb structure.

BRIEF DESCRIPTION OF DRAWINGS

FIG. 1 is a perspective view showing an example of a honeycomb formed body for use in a method for drying a honeycomb formed body according to the present invention.

FIG. 2 is a perspective view showing another example of a honeycomb formed body for use in a method for drying a honeycomb formed body according to the present invention.

FIG. 3 shows an example of a cross-sectional structure perpendicular to a flow path direction of cells in a honeycomb formed body having slits formed on an outer sidewall thereof.

FIG. 4 shows an example of a cross-sectional structure perpendicular to a flow path direction of cells in a honeycomb formed body having a donut-shape as viewed from the bottom.

FIG. 5 shows an example of a cross-sectional structure perpendicular to a flow path direction of cells in a honeycomb formed body in which the cells are radially arranged.

FIG. 6 shows an example of arrangement of a hot gas generator when a single columnar honeycomb formed body surrounded by a correction mold is horizontally placed and an example of arrangement of a baffle plate on an upstream side bottom surface.

FIG. 7 shows an example of arrangement of a hot gas generator when a plurality of columnar honeycomb formed bodies surrounded by a correction mold is horizontally placed and an example of arrangement of a baffle plate on an upstream side bottom surface.

FIG. 8 shows an example of arrangement of a hot gas generator when a single columnar honeycomb formed body surrounded by a correction mold is vertically placed and an example of arrangement of a baffle plate on an upstream side bottom surface.

FIG. 9 is a schematic diagram illustrating an example of a method for changing a wet-bulb temperature.

FIG. 10 is a schematic view of a state where a honeycomb formed body is sandwiched by a correction mold, as observed from the bottom side (with no baffle plate), in Examples.

FIG. 11 is a schematic view of a state where a honeycomb formed body is sandwiched by a correction mold, as observed from the upstream side bottom surface of a honeycomb formed body (with a baffle plate).

FIG. 12 shows an example of arrangement of a hot gas generator when a single columnar honeycomb formed body surrounded by a correction mold whose inner cross-sectional area is increased toward the downstream side is horizontally placed.

FIG. 13 schematically shows an embodiment of a drying system for carrying out a method for drying a honeycomb formed body according to the present invention.

FIG. 14 schematically shows another embodiment of a drying system for carrying out a method for drying a honeycomb formed body according to the present invention.

FIG. 15 schematically shows still another embodiment of a drying system for carrying out a method for drying a honeycomb formed body according to the present invention.

FIG. 16 schematically shows still another embodiment of a drying system for carrying out a method for drying a honeycomb formed body according to the present invention.

FIG. 17 schematically shows yet another embodiment of a drying system for carrying out a method for drying honeycomb formed bodies according to the present invention.

DESCRIPTION OF EMBODIMENTS (1) Drying Step

In one aspect, the present invention provides a method for drying at least one unfired columnar honeycomb formed body in which the at least one unfired columnar honeycomb formed body may be made of a raw material composition containing at least one raw material of ceramics, water and at least one heat-gelling binder, and may be provided with a plurality of cells having flow paths penetrating from a first bottom surface to a second bottom surface in an inside of an outer sidewall, the cells being defined by partition walls.

Examples of the raw material of ceramics can include, but not limited to, oxide based ceramics such as alumina, mullite, zirconia and cordierite; and non-oxide based ceramics such as silicon carbide, silicon nitride and aluminum nitride. Also, silicon carbide-metal silicon composites, silicon carbide/graphite composites and the like may be used. Among them, silicon carbide having high thermal conductivity is preferable when applied to heat exchange members.

The raw material of ceramics may be preferably provided in the form of powder. In this case, it is preferable to set the particle size distribution of the ceramics raw material powder such that tap density is higher, in terms of production costs of the honeycomb structure.

The water content in the raw material composition, that is, the water content of the honeycomb formed body before carrying out the drying step, may preferably be from 17.0 to 26.0% by mass, and more preferably from 19.5 to 22.5% by mass, and still more preferably from 19.5 to 20.5% by mass, based on 100% by mass of the raw material of ceramics. The water content in the raw material composition of 17.0% by mass or more based on 100% by mass of the raw material of ceramics will easily provide an advantage that quality of a green body tends to be stabilized. The water content in the raw material composition of 24.5% by mass or less based on 100% by mass of the raw material of ceramics can decrease a quantity of shrinkage during the drying and suppress deformation. As used herein, the water content in the raw material composition refers to a value measured by the loss on drying test method.

The heat-gelling binder refers to a binder having a property in which gelation occurs with an increasing temperature so that viscosity is increased (a heat-gelling property). Examples of the heat-gelling binder include, but not limited to, methyl cellulose, hydroxypropyl methyl cellulose, carboxymethyl cellulose, hydroxyethyl cellulose, hydroxyethyl methyl cellulose, and the like. Among these, methyl cellulose is most commonly used. The gelling temperatures of these heat-gelling binders vary depending on their types, and may be from about 50 to 90° C., and for example, about 55° C. for methyl cellulose. Also, a mixture of different heat-gelling binders may be used.

The amount of heat-gelling binder added in the raw material composition may preferably be from 3 to 15% by mass, and more preferably from 7 to 10% by mass, based on 100% by mass of the ceramics raw material. The amount of the heat-gelling binder added of 3% by mass or more will easily provide an advantage that deformation of the formed product can be suppressed. The concentration of the heat-gelling binder of 15% by mass or less will easily provide an advantage that a quantity of shrinkage during the drying can be decreased and a shape accuracy of the dried body can be improved.

As used herein, the gelling temperature of the heat-gelling binder refers to a temperature at which viscosity is drastically changed when the temperature is increased from 10° C. to 90° C. at a rate of 1° C./min and then decreased to 10° C. at a rate of 0.5° C./min while measuring the viscosity of an aqueous solution of the binder.

Examples of structures of honeycomb formed bodies are shown in FIG. 1 and FIG. 2. In a honeycomb formed body 1, a plurality of cells 3 having flow paths penetrating from a first bottom surface 5 to a second bottom surface 6 are defined by partition walls 2 inside an outer sidewall 4.

The honeycomb formed body may have any shape such as a columnar shape with polygonal bottoms (quadrangle, pentagon, hexagon, heptagon and octagon shapes, etc.), a columnar shape with circular bottoms (cylindrical shape), a columnar shape with oval bottoms, or the like. The honeycomb formed body shown in FIG. 1 has the columnar shape with rectangular bottoms, and the honeycomb formed body shown in FIG. 2 has the columnar shape with circular bottoms. In order to improve thermal shock resistance, a plurality of slits may also be formed on the outer sidewall 4 along the flow path direction of the cells, as shown in FIG. 3. In order to reduce a difference in drying rate in the radial direction, the honeycomb formed body may also have a donut-like columnar shape such that the honeycomb formed body has a cavity near the central axis of the honeycomb formed body, as viewed from the bottom, as shown in FIG. 4.

The honeycomb formed body satisfies a relationship: $L/D \leq 15$, and preferably $L/D \leq 6$, in which L is a length of the honeycomb formed body in the flow path direction of the cells and D is a length of the honeycomb formed body in the direction perpendicular to the flow path direction of the cells, so that the number of production steps can be reduced, and the honeycomb formed body can be produced at lower cost. Further, according to the present invention, the difference in drying rate in the longitudinal direction can be decreased, so that highly uniform drying is possible even if the ratio L/D is increased, and the quantity of deformation during the drying can be decreased. For example, the ratio may be $2 \leq L/D$, or may be $3 \leq L/D$. As used herein, the length D of the honeycomb formed body in the direction perpendicular to the flow path direction of the cells refers to a diameter of the honeycomb formed body if the bottom shapes of the honeycomb formed body are circular. If the bottom shapes of the honeycomb formed body is other than a circle, it means a diameter of a circle having the same area as that of one bottom surface.

Although the length L of the honeycomb formed body in the flow path direction of the cells is not limited, the length may preferably be 60 mm≤L, and more preferably 140 mm≤L, because a longer length results in higher mass productivity. On the other hand, if the length L is longer, the difference in drying rate tends to be generated on the blowing side and the exhaust side of hot gas, that is, in the flow path direction of the cells, so that variations in internal pores tend to occur. Therefore, the length L may preferably be L≤400 mm, and more preferably L≤300 mm. Although the length D of the honeycomb formed body in the direction perpendicular to the flow direction of the cells is not limited, the length D may preferably be 30 mm≤D, and more preferably 40 mm≤D, because a larger length can increase the flow rate of the fluid. On the other hand, the length D may preferably be D≤150 mm, and more preferably D≤120 mm, in order to prevent the difference in drying rate from tending to be generated between the vicinity of the central axis of the honeycomb formed body and the vicinity of the outer sidewall and to prevent generation of insufficient drying.

The shape of the cell in the cross section perpendicular to the flow path direction of the cells includes, but not limited to, preferably a square, a hexagon, an octagon, or a combination thereof. In the honeycomb formed bodies shown in FIGS. 1 and 2, the shape of the cell in the cross section perpendicular to the flow direction of the cells is a rectangle. Among them, square and hexagonal shapes are preferable. Such a cell shape will result in decreased pressure loss when allowing gas to flow through the honeycomb formed body. As shown in FIG. 5, it is also possible to radially arrange cells formed in arcs and straight lines by combining a plurality of concentric circles with radial straight lines extending from the central axis.

In the cross section perpendicular to the flow path direction of the cells, the honeycomb formed body may preferably have a cell density of from 4 to 186 cells/cm$^2$, and more preferably from 6 to 62 cells/cm$^2$. The cell density of 4 cells/cm$^2$ or more will tend to result in higher heat recovery performance. The cell density of 186 cells/cm$^2$ or less will tend to provide an advantage that an increase in the pressure loss is suppressed. The cell density is a value obtained by dividing the number of cells by the area of one bottom surface portion of the honeycomb formed body excluding the outer sidewall portion.

The thickness of the partition wall in the honeycomb formed body may preferably be from 0.05 to 1.5 mm, and more preferably 0.2 to 0.5 mm. When the honeycomb formed body is used as a heat exchanger member, the thickness of the partition wall of 0.05 mm or more allows higher heat recovery performance to be easily obtained, and the thickness of the partition wall of 1.5 mm or less allows lower pressure loss to be maintained. As used herein, the thickness of the partition wall is defined as a length of a line segment crossing the partition wall when the line is drawn to connect centers of gravity of the adjacent two cells to each other, in the cross section of the honeycomb formed body perpendicular to the flow path direction of the cells.

The thickness of the outer sidewall of the honeycomb formed body may preferably be 0.2 mm or more, and when used as a heat exchange member, it may more preferably be 1.0 mm or more, or may be possibly 1.5 mm or more. The thickness of the outer sidewall of 1.0 mm or more can allow increased mechanical strength as the heat exchange member. When the honeycomb formed body is used as the heat exchange member, the thickness of the outer sidewall of the honeycomb formed body may preferably be 20 mm or less, and more preferably 5 mm or less. The thickness of the outer sidewall of 20 mm or less allows extrusion molding. As used herein, the thickness of the outer sidewall is defined as a thickness in the direction of normal line relative to the outer side surface of the outer sidewall.

Additives such as surfactants and pore formers may be incorporated into the raw material composition as required. Examples of the surfactant that can be used include ethylene glycol, dextrin, fatty acid soap, polyalcohol and the like. These may be used alone or in combination with two or more.

The pore former is not particularly limited as long as it will form pores after firing, and includes, for example, graphite, starches, foaming resins, water absorbing resins, silica gel and the like.

The unfired columnar honeycomb formed body may be formed by kneading the raw material mixture to form a green body, and then subjecting the green body to extrusion molding to prepare a desired columnar honeycomb formed body. In the extrusion molding, a die having a desired overall shape, cell shape, partition wall thickness, cell density and the like can be used.

The resulting unfired formed body is dried to remove moisture. In one embodiment, the drying method according to the present invention includes a step of drying the honeycomb formed body by allowing hot gas satisfying $0.8 \leq T2/T1 \leq 3.3$ in which $T1$ represents a gelation temperature of the binder (° C.) and $T2$ represents a wet-bulb temperature of the hot gas (° C.), to pass through the flow paths of the plurality of cells such that the hot gas flows into the first bottom surface and flows out of the second bottom surface, while surrounding the outer side surface of the honeycomb formed body by a correction mold having an inner side surface shape corresponding to the outer side surface shape of the honeycomb formed body. In the step of drying the honeycomb formed body, the outer side surface of the honeycomb formed body receives pressure from the inner side surface of the correction mold, whereby the honeycomb formed body is subjected to shape correction. As used herein, the wet-bulb temperature of hot gas refers to a value measured by means of a psychrometer.

In view of the shape of the dried honeycomb formed body, the shape of the inner side surface of the correction mold may be appropriately changed under the constraint that the shape of the inner side surface of the correction mold is a shape corresponding to the outer side surface shape of the honeycomb formed body. For example, in the case where the honeycomb formed body has a portion with locally larger shrinkage, the local shrinkage can be reduced by setting the inner side surface shape such that the quantity of clearance with the correction mold at that portion is increased. As used herein, the phrase "the shape of the inner side surface of the correction mold is a shape corresponding to the outer side surface shape of the honeycomb formed body" means that the clearance between the inner side surface of the correction mold and the outer side surface of the honeycomb formed body is constantly 1 mm or less. Also, the phrase "the clearance between the inner side surface of the correction mold and the outer side surface of the honeycomb formed body is constantly 1 mm or less" means that when the honeycomb formed body is disposed in the correction mold before carrying out the drying step, the shortest distance from any point on the outer side surface to the inner side surface of the correction mold is 1 mm or less.

Thus, according to the embodiment, the columnar honeycomb formed body is rapidly dried because the hot gas is allowed to directly pass through the cells of the columnar honeycomb formed body. Then, by allowing the hot gas to directly pass through the cells of the columnar honeycomb formed body, the difference in drying rate in the direction perpendicular to the flow path direction of the cells will be reduced and deformation will be difficult, as well as the drying proceeds from the inside of the columnar honeycomb formed body, so that the columnar honeycomb formed body can be dried in a short time. Further, since the hot gas has become highly humid by raising the wet-bulb temperature to nearly the gelation temperature of the binder contained in the ceramics, the gelation of the binder will be promoted and the strength is increased, so that drying shrinkage during the drying will be suppressed and the corrected state will be easily maintained. Furthermore, according to the present embodiment, the surrounding of the columnar honeycomb formed body by the correction mold can enhance the effect of suppressing the deformation during the drying. That is, in the present embodiment, the drying with highly suppressed deformation and porosity variation can be achieved in a short time by the combination of the effect of correcting the shape by the correction mold, the effect of uniformly heating in a short time by the hot gas passing through the cells, and the effect of suppressing the deformation by the hot gas having higher humidity.

The shape and dimensions of the correction mold are not limited as long as the correction mold can have the inner side surface shape corresponding to the outer side surface shape of the honeycomb formed body and at least a part of the outer side surface of the honeycomb formed body can receive pressure from the inner side surface of the honeycomb formed body in the drying step. Therefore, in one embodiment, when the outer side surface of the honeycomb formed body is surrounded by the correction mold before carrying out the drying step, the outer side surface of the honeycomb formed body and the inner side surface of the correction mold can be entirely or partially brought into contact with each other. In another embodiment, when the outer side surface of the honeycomb formed body is surrounded by the correction mold before carrying out the drying step, the outer side surface of the honeycomb formed body and the inner side surface of the correction mold may not be in contact with each other at all. Even if the outer side surface of the honeycomb formed body and the inner side surface of the correction mold are not in contact with each other at all and the clearance is present between them, the honeycomb formed body may receive pressure from the correction mold through at least a partial contact with the correction mold due to slight deformation of the honeycomb formed body during the drying, and may undergo the deformation suppressing action such that the honeycomb formed body does not further deform. However, if the clearance is too large, the honeycomb formed body and the correction mold are not brought into contact with each other or the contacted portions are reduced even during the drying, so that the correcting effect by the correction mold will be smaller.

Therefore, in a preferred embodiment, the drying step may be carried out such that a ratio of a cross-sectional area $S1$ (which corresponds to the area of one bottom surface of the honeycomb formed body) of the honeycomb formed body before carrying out the drying step in the direction perpendicular to the flow path direction of the cells to an inner cross-sectional area $S2$ of the correction mold in the direction perpendicular to the flow path direction of the cells is $0.96 \leq S1/S2 \leq 1.04$, preferably $0.98 \leq S1/S2 \leq 1.04$, in a state where the outer side surface of the honeycomb formed body is surrounded by the correction mold. When the ratio $S1/S2$ equals 1, the outer side surface of the honeycomb formed body before carrying out the drying step is in close contact with the inner side surface of the correction mold. When the ratio S1/S2 is within the above range, a more appropriate pressure can be easily applied to the honeycomb formed body by the correction mold during the drying, and an improved effect of suppressing the deformation can be obtained. In terms of further enhancing the effect of suppressing the deformation during the drying, it is preferable that the outer side surface of the honeycomb formed body and the inner side surface of the correction mold are brought into full contact with each other before carrying out the drying step so as to somewhat squeeze the honeycomb formed body. Therefore, the ratio may more preferably be $1.00 \leq S1/S2 \leq 1.04$, and still more preferably $1.01 \leq S1/S2 \leq 1.04$.

Further, as shown in FIG. 12, the inner cross-sectional area S2 of the correction mold may be increased in the above range of S1/S2, toward the downstream side of the hot gas. For the correction mold in which the inner side surface extends in parallel to the flow path direction of the cells and the inner cross-sectional area S2 is constant, the honeycomb formed body tends to have a smaller outer diameter on the downstream side than on the upstream side of the hot gas due to the difference in drying rate in the flow path direction of the cells. Therefore, the uniformity of the outer diameter of the honeycomb formed body after carrying out the drying step can be improved by correcting the shape of the honeycomb formed body by the correction mold in which the inner cross-sectional area S2 is increased from the first bottom surface side toward the second bottom surface side (toward the downstream side of the hot gas).

In this case, it is effective to satisfy: $0.92 \leq S3/S4 \leq 1.00$ in which S3 represents an inner cross-sectional area of an end portion on the upstream side of the correction mold and S4 represents an inner cross-sectional area of an end portion on the downstream side. When S3 equals S4, the outer diameter of the dried honeycomb formed body will be smaller on the downstream side than on the upstream side of the hot gas. By decreasing the ratio S3/S4, the quantity of shrinkage on the downstream side can be suppressed, so that a difference in the outer diameter between the upstream side and the downstream side can be reduced. Since the difference in the outer diameter between the upstream side and the downstream side is increased as a height L (length in the flow path direction) of the honeycomb formed body is increased, it is preferable to set the ratio S3/S4 according to the value of L. For 60 mm$\leq$L<200 mm, a range of $0.94 \leq S3/S4 \leq 1.00$ is more preferable, and for 200 mm$\leq$L, a range of $0.92 \leq S3/S4 \leq 0.98$ is even more preferable.

It should be noted that S1 and S2 are values measured by a laser displacement meter and a three-dimensional measuring device before the honeycomb formed body is surrounded by the correction mold. Further, when the correction mold is configured of a plurality of divided parts (for example, half type), the S2 is a value measured when the respective parts are assembled without the honeycomb formed body.

Examples of materials for the correction mold include, but are not limited to, aluminum, stainless steel, iron, resins, ceramics and the like, and iron may be preferable when the mold is made of a sheet metal.

In a preferred embodiment, the correction mold may be made of a pair of half members divided along the flow path direction of the cells. Such a configuration of the correction mold is advantageous in terms of handling.

The drying of the honeycomb formed body using the hot gas satisfying the condition: $0.8 \leq T2/T1 \leq 3.3$ in which T1 represents the gelation temperature of the binder in the honeycomb formed body (° C.) and T2 represents the wet-bulb temperature of the hot gas (° C.) provides advantages that the shrinkage during the drying can be suppressed, and a variation in shape accuracy of the dried body and a variation in internal porosity can be reduced. Since the gelation of the binder actually starts at a temperature slightly lower than the gelation temperature T1, the gelation sufficiently proceeds even if the wet-bulb temperature T2 is slightly lower than the gelation temperature T1. Further, in terms of shortening the drying time, the condition may preferably be $0.8 \leq T2/T1 \leq 2.2$, and more preferably $0.8 \leq T2/T1 \leq 1.0$. For example, the following condition is possible: $50°$ C.$\leq T1 \leq 90°$ C., or $40°$ C.$\leq T2 \leq 300°$ C.

During the drying, ventilation drying may be carried out in combination with the hot gas drying. For example, the ventilation drying may be carried out prior to the hot gas drying, and the hot gas drying may be then carried out. Further, the ventilation drying may be carried out after the hot gas drying. The ventilation drying refers to a method of drying the honeycomb formed body by allowing air at ambient temperature to pass through the cells of the honeycomb formed body. However, the irradiation of the honeycomb formed body with electromagnetic waves, such as microwave drying and dielectric drying, is not preferable, because it tends to cause deformation due to local heating of the outer sidewall.

In a preferred embodiment, assuming that the dry-bulb temperature of the hot gas is T3 (° C.), the relationship: $T1 \leq T3$ is satisfied and T3 is lower than an initial temperature of thermal decomposition of the binder in the honeycomb formed body. The setting of the dry-bulb temperature of the hot gas to be equal to or higher than the gelation temperature of the binder is advantageous in that the drying rate can be shorter and the deformation during the drying can be easily suppressed. Further, the setting of the dry-bulb temperature of the hot gas to be lower than the initial temperature of thermal decomposition of the binder is advantageous in that the strength of the dried body can be maintained. In a more preferred embodiment, assuming that the dry-bulb temperature of the hot gas is T3 (° C.), the relationship: $120°$ C.$\leq T3 \leq 170°$ C. is satisfied and T3 is lower than the initial temperature of thermal decomposition of the binder by $5°$ C. or more.

For the dry-bulb temperature T3 (° C.) of the hot gas and the wet-bulb temperature T2 (° C.) of the hot gas, $T3-T2>0$ is preferable, $T3-T2 \leq 60$ is more preferable, and $T3-T2 \leq 90$ is even more preferable, in terms of shortening the drying time. The larger the difference between T3 and T2, the greater the drying rate, which will contribute to the shortening of the drying time.

As used herein, the dry-bulb temperature of the hot gas refers to a value measured by a thermocouple. As used herein, the initial temperature of thermal decomposition refers to a value measured by TG-DTA (Thermal Gravimetric-Differential Thermal Analyzer).

As the gas velocity of the hot gas is higher, the drying time is shorter, and it is easy to suppress the deformation of the honeycomb formed body. Therefore, the gas velocity of the hot gas passing through the flow paths of the cells may preferably be 2.0 m/s or higher, and more preferably 4.0 m/s or higher. Further, there is a limit to the effect of shortening the drying time by increasing the gas velocity. Therefore, the gas velocity of the hot gas passing through the flow paths of the cells may preferably be 10 m/s or lower, and more preferably 9 m/s or lower, in view of economy. As used herein, the gas velocity of the hot gas passing through the flow paths of the cells is a value measured by a thermal type anemometer according to JIS T8202-1997.

During the drying, the effect of suppressing the deformation due to drying is enhanced when the hot gas does not enter a boundary portion between the outer side surface of the honeycomb formed body and the inner side surface of the correction mold. Therefore, in a preferred embodiment, the drying step is carried out in a state where a baffle plate for preventing the hot gas from entering the boundary portion between the outer side surface of the honeycomb formed body and the inner side surface of the correction mold is arranged on the upstream side of the first bottom surface.

The drying is preferably carried out in a state where a pressure ($P_2$) (absolute pressure) of the hot gas immediately after flowing out of the second bottom surface of the honeycomb formed body is 100 kPa or less and is equal to or less than a pressure ($P_1$) of the hot gas immediately before flowing into the first bottom surface of the honeycomb formed body, because inflow of outside air is prevented and a partial pressure of water vapor is decreased, so that the drying rate can be increased. That is, during the drying, the relationships: $P_2 \leq 100$ kPa and $0 \leq P_1 - P_2$ are preferably satisfied. However, if the $P_2$ is too small, the flow of the hot gas will be changed, and the effect of increasing the drying rate will be deteriorated. Therefore, the relationship: $10 \text{ Pa} \leq P_2$ is preferably satisfied.

To prevent the hot gas from entering the above boundary portion, the baffle plate may be preferably arranged on the upstream side of the first bottom surface such that the baffle plate covers the outer sidewall of the honeycomb formed body, the boundary portion between the outer side surface of the honeycomb formed body and the inner side surface of the correction mold, and 5 to 30% of the number of all the cells, preferably 15 to 30% of the number of all the cells, more preferably 20 to 30% of the number of all the cells, from the cells arranged on the outermost periphery toward the cells on the inner side.

Materials for the baffle plate include, but not limited to, aluminum, stainless steel, iron, resins, ceramics, and the like.

FIG. 6 schematically shows a baffle plate 106 disposed on the upstream side of a first bottom surface 104 of one columnar honeycomb formed body 102 surrounded by a correction mold 101. In FIG. 6, the honeycomb formed body 102 is horizontally placed so that the flow path direction of the cells 108 is horizontal. The flow of the hot gas is indicated by arrows 107. The hot gas generated from a hot gas generator 103 passes through a circular opening portion 112 provided at the central portion of the baffle plate 106, flows from the first bottom surface 104 of the honeycomb formed body 102 surrounded by the correction mold 101 into the cells 108 and flows out of a second bottom surface 105. The baffle plate 106 is fixed to an end portion on the upstream side of the correction mold 101. The fixing method includes, but not limited to, for example, screw fastening and welding. The baffle plate 106 is arranged such that the baffle plate 106 covers an outer sidewall 109 of the honeycomb formed body, a boundary portion 110 between the outer side surface of the honeycomb formed body and the inner side surface of the correction mold and a predetermined percentage of the cells from the cells arranged at the outermost periphery toward the cells on the inner side. The central position of the opening portion 112 of the baffle plate 106 coincides with the central axis of the honeycomb formed body, whereby the hot gas can be directed from the vicinity of the central axis of the honeycomb formed body 102 toward the outer sidewall 109 so that uniform drying is promoted, and the effect of suppressing the deformation during the drying is improved.

When the honeycomb formed body 102 is dried by the hot gas, a plurality of honeycomb formed bodies 102 can be arranged in series in the flow path direction of the cells and these can be simultaneously dried, as shown in FIG. 7. Alternatively, the honeycomb formed body can be dried by the hot gas in a state where the honeycomb formed body is vertically arranged such that the flow path direction of the cells 108 is vertical, as shown in FIG. 8.

The wet-bulb temperature may also be adjusted by circulating the hot gas that has passed through the honeycomb formed body 102. The hot gas that has passed through the honeycomb formed body 102 contains moisture scattered from the honeycomb formed body 102. Therefore, the circulating of the hot gas can increase the wet-bulb temperature. For example, as shown in FIG. 9, a circulation duct 114 may be installed. The circulation duct 114 is for feeding the hot gas that has passed through the honeycomb formed body 102 and has flowed out of the second bottom surface 105 into the first bottom surface 104 of the honeycomb formed body 102 again. An exhaust blower 116 is installed in the route of the circulation duct 114. The hot gas can be circulated through the circulation duct 114 by means of the blowing function of the blower 116. Further, valves capable of adjusting the flow rate (not shown) are installed in an exhaust duct 118 and an intake duct 120, respectively. By adjusting the opening degree of each valve, an amount of exhaust gas discharged from the exhaust duct 118 and an amount of intake air from the intake duct 120 are adjusted, whereby the wet-bulb temperature is adjusted.

The baffle plate 106 may preferably be as close as possible to the first bottom surface 104 of the honeycomb formed body 102 in order to prevent the hot gas from entering the boundary portion 110 between the outer side surface of the honeycomb formed body and the inner side surface of the correction mold. More particularly, the gap between the baffle plate 106 and the first bottom surface 104 of the honeycomb formed body 102 in the flow path direction of the cells may preferably be 10 mm or less, and more preferably 5 mm or less, and even more preferably the baffle plate 16 is brought into contact with the first bottom surface 104 of the honeycomb formed body 102.

In terms of reducing the variation in the total pore volume of the honeycomb formed body in the flow direction of the cells, the drying step may be preferably carried out such that the water content of the dried honeycomb formed body is 0.07 g or less per 1 g of the dried honeycomb formed body, and preferably 0.05 g or less, and more preferably 0.02 g or less. The lower limit of the water content may not be particularly set, and the water content of the dried honeycomb formed body may be 0 g per 1 g of the dried honeycomb formed body.

If the honeycomb formed body is dried by allowing the hot gas to pass through the cells in one direction, the drying proceeds from the vicinity of the central axis of the honeycomb formed body on the upstream side of the hot gas toward the downstream side and the radial direction in order, so that a difference in the outer diameter of the honeycomb formed body tends to occur in the flow path direction of the cells. Therefore, it is preferable to invert the honeycomb during the drying step, or to invert the blowing direction of the hot gas. This will allow reduction of the difference in drying rate of the honeycomb formed body in the flow path direction of the cells, so that the difference in the outer diameter of the honeycomb formed body can be reduced in the flow path direction of the cells. In addition, waste of thermal energy is decreased and the drying can efficiently proceed, so that the drying time can also be shortened. The timing of inverting the hot gas or the honeycomb formed body may be appropriately set depending on the size of the honeycomb formed body and the cell structure.

<Drying System 300>

FIG. 13 schematically shows one embodiment of a drying system for carrying out the method for drying the honeycomb formed body according to the present invention. A drying system 300 according to the embodiment includes a duct 312 for forming a path of a drying gas 303; a honeycomb formed body 302 disposed in the path of the drying gas 303 and surrounded by a correction mold 301; a heater 306 such as an electric heater disposed on the upstream side of a first bottom surface 304 of the honeycomb formed body 302; a blowing fan 308 disposed on the upstream side of the heater 306; and an exhaust fan 310 disposed on the downstream side of a second bottom surface 305 of the honeycomb formed body 302.

In the drying system 300 according to the embodiment, the drying gas 303 supplied through the blowing fan 308 is heated by the heater 306 while flowing through the duct 312. The heated drying gas 303 (hot gas) then flows into the first bottom surface 304 of the honeycomb formed body 302, passes through the flow paths of the cells, and flows out of the second bottom surface 305. The drying gas 303 that has flowed out of the second bottom surface 305 is discharged through the exhaust fan 310. In the drying system 300 according to the embodiment, the inside of the flow paths of the cells of the honeycomb formed body 302 can be maintained at a negative pressure, for example, by making the gas volume of the exhaust fan 310 larger than the gas volume of the blowing fan 308.

<Drying System 400>

FIG. 14 schematically shows another embodiment of a drying system for carrying out the method for drying the honeycomb formed body according to the present invention. A drying system 400 according to the embodiment includes a duct 412 for forming a path of a drying gas 403; a honeycomb formed body 402 disposed in the path of the drying gas 403 and surrounded by a correction mold 401; a heater 406 such as an electric heater disposed on the upstream side of a first bottom surface 404 of the honeycomb formed body 402; a blowing fan 408 disposed on the upstream side of the heater 406; and an exhaust fan 410 disposed on the downstream side of a second bottom surface 405 of the honeycomb formed body 402.

In the drying system 400 according to the embodiment, the drying gas 403 supplied through the blowing fan 408 is heated by the heater 406 while flowing through the duct 412. The heated drying gas 403 (hot gas) then flows into the first bottom surface 404 of the honeycomb formed body 402, passes through the flow paths of the cells, and flows out of the second bottom surface 405. The drying gas 403 that has flowed out of the second bottom surface 405 is discharged through the exhaust fan 410.

In the drying system 400 according to the embodiment, the duct 412 includes a duct portion 412a forming the path of the drying gas 403 flowing toward the blowing fan 408; a duct portion 412b forming the path of the hot gas flowing out of the second bottom surface 405 of the honeycomb formed body 402; and a duct portion 412c branched at a branching point 416 of the duct portion 412b and connected to a confluence 413 of the duct portion 412a to form a circulation path. Therefore, the hot gas flowing out of the second bottom surface 405 of the honeycomb formed body 402 is in communication with the path of the drying gas at the confluence 413 on the upstream side of the blowing fan 408 via the circulation path. According to the drying system 400 of the embodiment, at least a part of the hot gas flowing out of the second bottom surface 405 of the honeycomb formed body 402 can be circulated to utilize the hot gas as a part or all of the hot gas flowing into the first bottom surface 404 of the honeycomb formed body 402.

In the drying system 400 according to the embodiment, a valve 411 is provided on the upstream side of the confluence 413 of the duct portion 412a, and a valve 415 is provided on the downstream side of the confluence 416 of the duct portion 412b. An amount of circulating hot gas can be controlled by adjusting the opening degree of each of the valves 411 and 415, hereby adjusting the wet-bulb temperature of the hot gas.

Further, in the drying system 400 according to the embodiment, a valve 414 is provided in the duct portion 412c. An amount of circulating hot gas can also be controlled by adjusting the opening degree of the valve 414. Also, the circulating hot gas can be stopped by closing the valve 414.

Examples of the valves 411, 414 and 415 includes ON-OFF valves in which the opening degree of valve can take only two states of fully open/fully closed, such as motor operated valves and electromagnetic valves; and continuous control valves in which the opening degree of valve can be continuously changed. In one preferred embodiment, the valve 411 and valve 415 are the continuous control valves and the valve 414 is the ON-OFF valve.

<Drying System 500>

FIG. 15 schematically shows yet another embodiment of a drying system for carrying out the method for drying the honeycomb formed body according to the present invention. A drying system 500 according to the embodiment includes a duct 512a for forming a path of a drying gas 503a; a honeycomb formed body 502 disposed in the path of the drying gas 503a and surrounded by a correction mold 501; a heater 506a such as an electric heater arranged on the upstream side of a first bottom surface 504 of the honeycomb formed body 502 as viewed from the flow direction of the drying gas 503a; a blowing fan 508a disposed on the upstream side of the heater 506a as viewed from the flow direction of the drying gas 503a; and an exhaust fan 510a disposed on the downstream side of a second bottom surface 505 of the honeycomb formed body 502 as viewed from the flowing direction of the drying gas 503a.

The drying system 500 according to the embodiment also includes a valve 514a disposed in the path of the drying gas 503a and between the first bottom surface 504 of the honeycomb formed body 502 and the blowing fan 508a; and a valve 516a disposed in the path of the drying gas 503a and between the second bottom surface 505 of the honeycomb formed body 502 and the exhaust fan 510a.

Further, in the drying system 500 according to the embodiment, a duct 512b forming an inflow path of the drying gas 503b is in communication with a duct 512a between a valve 516a and the second bottom surface 505 of the honeycomb formed body 502. The duct 512b includes a blowing fan 508b; a heater 506b disposed on the downstream side of the blowing fan 508b as viewed from the flowing direction of the drying gas 503b; and a valve 514b disposed on the downstream side of the heater 506b as viewed from the flowing direction of the drying gas 503b.

Further, in the drying system 500 according to the embodiment, a duct 512c forming an outflow path of the drying gas 503b is in communication with the duct 512a between the valve 514a and the first bottom surface 504 of the honeycomb formed body 502. The duct 512c is provided with the exhaust fan 510b and the valve 516b disposed on the upstream side of the exhaust fan 510b as viewed from the flowing direction of the drying gas 503b.

In the drying system 500 according to the embodiment, when the blowing fan 508a and the heater 506a are operated while opening the valve 514a and the valve 516a and closing the valve 514b and the valve 516b, the drying gas 503a supplied through the blowing fan 508a is heated by the heater 506a while flowing through the duct 512a. The heated drying gas 503a (hot gas) then flows into the first bottom surface 504 of the honeycomb formed body 502, passes through the flow paths of the cells, and flows out of the second bottom surface 505. The drying gas 503a that has flowed out of the second bottom surface 505 is discharged through the exhaust fan 510a.

Further, in the drying system 500 according to the embodiment, when the blowing fan 508b and the heater 506b are operated while opening the valve 514b and the valve 516b and closing the valve 514a and the valve 516a, the drying gas 503b supplied through the blowing fan 508b is heated by the heater 506b while flowing through the duct 512b. The heated drying gas 503b (hot gas) then flows into the second bottom surface 505 of the honeycomb formed body 502, passes through the flow paths of the cells, and flows out of the first bottom surface 504. The drying gas 503b that has flowed out of the first bottom surface 504 is discharged through the exhaust fan 510b.

In other words, according to the drying system 500 according to the embodiment, the direction of the hot gas passing through the flow paths of the cells of the honeycomb formed body can be inverted by switching the blowing fans and the valves. The inverting can also be carried out during the drying.

Examples of the valves 514a, 514b, 516a and 516b includes ON-OFF valves in which the opening degree of valve can take only two states of fully open/fully closed, such as motor operated valves and electromagnetic valves; and continuous control valves in which the opening degree of valve can be continuously changed. In one preferred embodiment, all of the valves 514a, 514b, 516a and 516b are the ON-OFF valve.

<Drying System 600>

FIG. 16 schematically shows still another embodiment of a drying system for carrying out the method for drying the honeycomb formed body according to the present invention. A drying system 600 according to the embodiment has the same basic configuration as that of the drying system 400 as shown in FIG. 14, and the elements denoted by the same reference numerals indicate the same elements. Therefore, the detailed description will be omitted.

However, the drying system 600 according to the embodiment is different from the system 400 in that the former is further provided with a duct 612 that communicates with the first bottom surface 404 of the honeycomb formed body 402 and forms a supplying path for a cooling gas 603. Therefore, after the drying step, cold gas, instead of the hot gas, can be supplied to the first bottom surface 404 of the honeycomb formed body 402. After the cold gas passes through the flow paths of the cells of the honeycomb formed body 402 and flows out of the second bottom surface 405, the cold gas is discharged through the exhaust fan 410 as with the hot gas.

In the drying system 400 shown in FIG. 14, even if the blowing fan 408 and the heater 406 are stopped to end the drying step, it takes a certain time to cool the honeycomb formed body 402. Further, even if the blowing fan 408 is kept operated in the state where the heater 406 is stopped, the duct 412 is not immediately cooled, so that it takes a certain time to cool the honeycomb formed body 402. In contrast, according to the drying system 600 shown in FIG. 16, the honeycomb formed body 402 can be rapidly cooled, because the cooling gas 603 flows from another path that does not pass through the heater 406.

A valve 614 may be installed in the duct 412 forming the path of the drying gas 403 and between the blowing fan 408 and the first bottom surface 404 of the honeycomb formed body 402, typically between the heater 406 and the first bottom surface 404 of the honeycomb formed body 402. Further, a valve 616 may be installed in the path of the duct 612 forming the supplying path for the cooling gas 603 and on the upstream side of the first bottom surface 404 of the honeycomb formed body 402 as viewed from the flow direction of the cooling gas 603. After the end of the drying step, the cooling gas 603 can be immediately supplied to the honeycomb formed body 402 by closing the valve 614 and opening the valve 616.

Examples of the valves 614 and 616 includes ON-OFF valves in which the opening degree of valve can take only two states of fully open/fully closed, such as motor operated valves and electromagnetic valves; and continuous control valves in which the degree of valve opening can be continuously changed. In one preferred embodiment, both of the valves 614 and 616 are the ON-OFF valve.

The duct 612 may be in direct communication with the first bottom surface 404 of the honeycomb formed body 402 without merging with the duct 412 in the path of the duct 612. Further, the duct 612 may merge with the duct 412 at a confluence 616 in the path of the duct 612. In the latter case, the valves 614 and 616 are preferably installed on the upstream side of the confluence 616.

The temperature of the cooling gas 603 may preferably be 50° C. or lower, and more preferably 40° C. or lower, and even more preferably 30° C. or lower, in order to enhance the safety when taking out the honeycomb formed body after the drying and to increase the cooling rate. The temperature of the cooling gas 603 may preferably be 5° C. or higher, and more preferably 10° C. or higher, in order to prevent freezing of condensed water during the drying.

<Drying System 700>

FIG. 17 schematically shows still another embodiment of a drying system for carrying out the method for drying the honeycomb formed bodies according to the present invention. A drying system 700 according to the embodiment has the same basic configuration as that of the drying system 400 as shown in FIG. 14, and the elements denoted by the same reference numerals indicate the same elements. Therefore, the detailed description will be omitted.

However, the drying system 700 according to the embodiment is different from the drying system 400 shown in FIG. 14 in that the path of the heated drying gas 403 (hot gas) is branched and is in communication with the first bottom surfaces 404 of a plurality of honeycomb formed bodies 402. Referring to FIG. 17, the duct 412 forming the path of the drying gas is branched on the downstream side of the heater 406 and is in communication with the first bottom surfaces 404 of the plurality of honeycomb formed bodies 402 arranged in parallel.

In addition, valves 702 may be installed in the respective branched paths of the hot gas. It is possible to switch the hot gas flowing into the first bottom surfaces 404 of the plurality of honeycomb formed bodies 402 by operating the opening and closing of each valve 702. For example, the plurality of honeycomb formed bodies 402 can be simultaneously dried by simultaneously opening all the valves 702 of the plurality of valves 702. Further, some of the honeycomb formed bodies 402 of the plurality of honeycomb molded bodies 402 can be selectively dried by opening one or more of the valves 702 among the plurality of valves 702 and closing the remaining valve(s) 702. During the drying of some of the honeycomb formed bodies 402, the honeycomb formed body(s) 402 to be subsequently dried may be installed, or the dried honeycomb formed body(s) 402 may be cooled. Then, the hot gas can be rapidly supplied to the honeycomb formed body(s) 402 to be subsequently dried by switching the valves 702 immediately after the drying of some of the honeycomb molded bodies 402 is completed. This eliminates the need for resting the heater 406, so that the operation efficiency of the heater 406 can be improved.

(2) Steps After Drying

After carrying out the drying step, a honeycomb structure made of ceramics can be produced by firing the dried honeycomb formed body. A degreasing step for removing the binder can also be carried prior to the firing. After drying, the outer circumference may be subjected to grinding work for increasing the cylindricity, or the outer circumferential wall may be subjected to slit machining, if necessary. Furthermore, it is also possible to cut and process the honeycomb formed body so as to have a predetermined length in the flow path direction of the cells according to required specifications. These processing treatments may be carried out at any timing before the degreasing/firing and after the degreasing/firing. However, when these processing treatments are difficult due to higher strength after the degreasing/firing as in the case of Si impregnation firing, these processing treatments are preferably carried out before the degreasing/firing. Although the degreasing and firing may be carried out under any known conditions, it is preferable to appropriately set the temperature, time and atmosphere according to the raw material system. Typical degreasing conditions and firing conditions in the case of producing the heat exchanger member are illustrated below.

Although the binder and the molding aid are necessary during the molding, they are finally unnecessary. Therefore, it is preferable to carry out the degreasing step to remove them prior to the firing. The heating temperature of the honeycomb formed body in the degreasing step may preferably be 300° C. or higher, and more preferably 350° C. or higher, and still more preferably 400° C. or higher, in terms of ease of firing of the binder. The heating temperature of the honeycomb formed body in the degreasing step may preferably be 600° C. or lower, and more preferably 550° C. or lower, and still more preferably 500° C. or lower, in order to suppress the production costs during the degreasing.

The heating time at the above heating temperature of the honeycomb formed body may preferably be 1 hour or more, and more preferably 2 hours or more, and even more preferably 3 hours or more, in terms of ease of combustion of the binder. The heating time at the above heating temperature of the honeycomb formed body may preferably be 10 hours or less, and more preferably 8 hours or less, and even more preferably 6 hours or less, in order to suppress the production costs during the degreasing.

The atmosphere when carrying out the degreasing step includes an air atmosphere, an inert atmosphere, and a reduced pressure atmosphere. Among them, the inert reduced pressure atmosphere may be preferred, because they can prevent insufficient sintering due to oxidation of the raw materials and easily reduce oxides contained in the raw materials.

The firing method includes, but is not limited to, reaction sintering, recrystallization sintering, Si impregnation under reduced pressure, Si impregnation under normal pressure and Si bond SiC. The reaction sintering refers to a firing method of impregnating a formed body composed of SiC and C with molten Si and obtaining SiC by reaction of C with Si. The recrystallization sintering refers to a firing method of sintering SiC particles molded with high density at an elevated temperature of 2000° C. or higher. The Si impregnation under reduced pressure refers to a firing method of performing impregnation with metal silicon under a reduced pressure. The Si impregnation under normal pressure refers to a firing method of performing impregnation with metal silicon under normal pressure. The Si bond SiC refers to a firing method of firing a raw material mixture composed of SiC and Si to obtain a sintered body having a structure in which SiC is held by Si. The removal of the binder may create corresponding gaps in the formed body. It is thus preferable to carry out the method of firing the formed body while contacting it with metal silicon to melt the metal silicon and impregnate the gaps with Si. Such a Si impregnated type sintered body can result in improved mechanical strength and thermal conductivity.

The firing may be preferably carried out in an inert and reduced pressure atmosphere in order to prevent insufficient sintering due to oxidation of the raw materials and to easily reduce oxides contained in the raw materials. The inert atmosphere includes a nitrogen gas atmosphere, a rare gas atmosphere such as argon, or a mixed gas atmosphere in which these gases are mixed.

The firing temperature may preferably be 1350° C. or higher, and more preferably 1400° C. or higher, and still more preferably 1450° C. or higher, in order to sufficiently perform sintering. The firing temperature may preferably be 2200° C. or lower, and more preferably 1800° C. or lower, and still more preferably 1600° C. or lower, in order to reduce the production costs during the firing.

In order to sufficiently carrying out the sintering, the heating time of the formed body at the firing temperature as described above may preferably be 0.25 hours or more, and more preferably 0.5 hour or more, and even more preferably 0.75 hour or more. In order to reduce the production costs during the firing, the heating time of the formed body at the firing temperature as described above may preferably be 5 hours or less, and more preferably 4 hours or less, and still more preferably 3 hours or less.

A firing furnace that may be used includes, but not particularly limited to, an electric furnace, a gas furnace and the like.

The honeycomb structure made of ceramics according to the present invention can be used, for example, as a heat exchange member, a catalyst support, a filter, and the like.

EXAMPLES

Hereinafter, Examples will be illustrated for better understanding of the present invention and its advantages, but the present invention is not limited to the Examples.

Test Example 1

Test for Effect of Wet-Bulb Temperature of Hot Gas

As silicon carbide (SiC) powder, silicon carbide (SiC) powder having a bimodal particle size distribution was prepared.

As the binder, hydroxypropyl methyl cellulose (Shin-Etsu Chemical Co., Ltd. "METOLOSE®", 65SH-75000) was prepared. The gelation temperature of the binder was 65° C., and the initial temperature of thermal decomposition was 200° C.

The silicon carbide powder, the binder, a molding aid and water were mixed to prepare a raw material mixture.

The raw material mixture was kneaded by means of a vacuum green body kneader to prepare a cylindrical green body. The resulting cylindrical green body was molded using an extruder to obtain an undried honeycomb formed body in which each cell had a square cross section. Target external dimensions of the undried honeycomb formed body were a diameter (D) of 57 mm×a height (L) of 165 mm. A target cell density was 14 cells/cm$^2$, a target thickness of the partition wall was 0.38 mm, and a target thickness of the outer sidewall was 2.5 mm. The water content of the undried honeycomb formed body was 20.0% by mass based on 100% by mass of the silicon carbide (SiC) powder blended in the raw material mixture.

The honeycomb formed body horizontally arranged such that the flow path direction of the cells was horizontal was then sandwiched from the vertical directions by an iron correction mold having a cylindrical inner surface comprised of a pair of half members that were divided along the flow path direction of the cells (Test Examples 1-1 to 1-6). The conditions of S1/S2 were as shown in Table 1 according to the test numbers. FIG. 10 shows a schematic view when observing the state where the honeycomb formed body 102 was sandwiched by the correction mold 101, from the upstream bottom surface side. The honeycomb formed body 102 was dried using a hot gas generator by allowing the hot gas to flow through the flow paths of the cells of the honeycomb formed body 102 under the conditions shown in Table 1 according to the test numbers, in the state where the outer side surface of the honeycomb formed body 102 was surrounded by the correction mold 101. On the other hand, each of the honeycomb formed bodies of Test Example 1-7 was dried using the hot gas generator by allowing the hot gas to flow through the flow paths of the cells of the honeycomb formed body under the conditions shown in Table 1, in the state where the honeycomb formed body was not housed in the correction mold.

In Table 1, the measuring methods of "S1/S2", "Gelation Temperature (T1)", "Wet-bulb Temperature (T2)", "Dry-bulb Temperature (T3)" and "Gas Velocity" are as described earlier. In this test, the hot gas drying was carried out until the water content of the honeycomb formed body was completely removed (that is, the water content was 0 g). In Table 1, "Drying Time to Absolute Dry" means a time required until the water content after drying the honeycomb formed body reached 0 g. The drying time to absolute dry was determined from a relationship between drying time and a change in weight, obtained by using another honeycomb formed body sample obtained under the same production conditions.

For each dried honeycomb formed body, "cylindricity" was automatically measured using a three-dimensional measuring device. The "cylindricity" means a value which is represented by a difference between a geometric cylinder (standard cylinder) with the maximum radius that can be inscribed on the outer side surface of the honeycomb structure and a geometric cylinder (standard cylinder) with the minimum radius that can be circumscribed on the outer side surface of the honeycomb structure, and which indicates the degree of whether or not it is a geometric cylindrical body. If the cylindricity is smaller, the cylinder can have a shape closer to a geometric cylinder, and can result in lesser deformation during the drying. The results are shown in Table 1.

For each dried honeycomb formed body, the variation in the total pore volume was measured by mercury porosimetry. The results are shown in Table 1. It should be note that the variation in the total pore volume refers to a difference between the maximum value and the minimum value measured on 15 mL samples obtained by cutting out the total three positions of both ends and the center in the flow direction of the cells from each honeycomb formed body as described above.

TABLE 1-1

|  | | Binder | Hot Gas Conditions | | | | |
| --- | --- | --- | --- | --- | --- | --- | --- |
|  | S1/S2 | Gelation Temperature (T1) ° C. | Wet-bulb Temperature (T2) ° C. | T2/T1 | Dry-bulb Temperature (T3) ° C. | Gas Velocity m/s | Drying Time to Absolute Dry min |
| Test Example 1-1 | 1.02 | 65 | 40 | 0.615 | 160 | 2.0 | 5 |
| Test Example 1-2 | 1.02 | 65 | 55 | 0.846 | 160 | 2.0 | 6 |
| Test Example 1-3 | 1.02 | 65 | 60 | 0.923 | 160 | 2.0 | 6.2 |
| Test Example 1-4 | 1.02 | 65 | 150 | 2.308 | 160 | 2.0 | 9 |
| Test Example 1-5 | 1.02 | 65 | 210 | 3.231 | 300 | 2.0 | 6 |
| Test Example 1-6 | 1.02 | 65 | 240 | 3.692 | 300 | 2.0 | 8 |
| Test Example 1-7 | — | 65 | 40 | 0.615 | 160 | 2.0 | 4 |

TABLE 1-2

|  | Cylindricity mm | Variation in Total Pore Volume cc/g | Heat Resistance Evaluation | Variation in Heat Exchange Performance | Remarks |
| --- | --- | --- | --- | --- | --- |
| Test Example 1-1 | 0.8 | 0.01 | x | 2.0% | Comparative Example |
| Test Example 1-2 | 0.65 | 0.002 | ○ | 0.4% |  |
| Test Example 1-3 | 0.6 | 0.002 | ○ | 0.4% |  |
| Test Example 1-4 | 0.65 | 0.002 | ○ | 0.4% |  |
| Test Example 1-5 | 0.7 | 0.004 | ○ | 0.8% |  |
| Test Example 1-6 | 0.95 | 0.007 | x | 1.4% | Comparative Example |
| Test Example 1-7 | 1.2 | 0.01 | x | 2.0% | Comparative Example |

Test Example 2

Test for Effect of Baffle Plate

The same undried honeycomb formed body as that of Test Example 1-2 was produced. The honeycomb formed body horizontally arranged such that the flow path direction of the cells was horizontal was then sandwiched from the up and down directions using the same correction mold as that used in Test Example 1-2, with the exception that, as shown in FIG. 11, an iron baffle plate 106 was fixed to the end portion on the upstream side of the correction mold 101 by means of screw fastening. The ratio S1/S2 was the same as that of Test Example 1-2.

FIG. 11 shows a schematic view when observing the state where the honeycomb formed body 102 was sandwiched by the correction mold 101, from the upstream side bottom surface (the first bottom surface) of the honeycomb formed body. The dotted line in the figure indicates the contour of the outer side surface of the honeycomb formed body 102 hidden by the baffle plate 106. In any of the Test Examples, the baffle plate 106 was arranged so that the outer sidewall 109 of the honeycomb formed body 102 as well as the boundary portion 110 between the outer side surface of the honeycomb formed body 102 and the inner surface of the correction mold 101 were hidden. In this case, the gap between the baffle plate 106 and the upstream side bottom surface (the first bottom surface) 104 of the honeycomb formed body 102 in the flow path direction of the cells was 3 mm or less. Further, the percentage of the number of the cells covered by the baffle plate from the cells arranged at the outermost periphery toward the cells on the inner side, relative to all the cells ("Percentage of Covered Cells" indicated in Tables) was varied by changing the size of the opening portion 112 according to the test numbers. The number of covered cells was counted only for the cells which were completely hidden when observed from the upstream bottom surface side of the honeycomb formed body.

Each honeycomb formed body was dried to absolute dry by allowing the hot gas to flow through the flow paths of the cells of the honeycomb formed body using the hot gas generator at the same wet-bulb temperature, dry-bulb temperature and gas velocity as those of Test Example 1-2, in the state where the outer side surface of the honeycomb formed body was surrounded by the correction mold. For each dried honeycomb formed body, the "Cylindricity" and "Variaiton in Total Pore Volume" were determined by the same methods as those of Test Example 1-2. The results are shown in Table 2.

TABLE 2

| | Percentage of Covered Cells (%) | Drying Time to Absolute Dry min | Cylindricity mm | Variation in Total Pore Volume cc/g | Heat Resistance Evaluation | Variation in Heat Exchange Performance |
|---|---|---|---|---|---|---|
| Test Example 1-2 | 0 (No Baffle Plate) | 6 | 0.65 | 0.002 | ○ | 0.4% |
| Test Example 2-1 | 5 | 6 | 0.5 | 0.002 | ○ | 0.4% |
| Test Example 2-2 | 15 | 6.1 | 0.45 | 0.002 | ○ | 0.4% |
| Test Example 2-3 | 30 | 6.3 | 0.52 | 0.002 | ○ | 0.4% |
| Test Example 2-4 | 50 | 7 | 0.75 | 0.002 | x | 0.4% |

Test Example 3

Test for Effect of Gas Velocity

The same undried honeycomb formed body as that of Test Example 1-2 was produced. The undried honeycomb formed body was housed in the correction mold and dried to absolute dry under the same conditions as those of Test Example 1-2 with the exception that the gas velocity was changed to the conditions shown in Table 3. For each dried honeycomb formed body, the "Cylindricity" and "Variation in Total Pore Volume" were determined by the same methods as those of Test Example 1-2. The results are shown in Table 3.

TABLE 3

| | Gas Velocity m/s | Drying Time to Absolute Dry min | Cylindricity mm | Variation in Total Pore Volume cc/g | Heat Resistance Evaluation | Variation in Heat Exchange Performance |
|---|---|---|---|---|---|---|
| Test Example 1-2 | 2.0 | 6 | 0.65 | 0.002 | ○ | 0.4% |
| Test Example 3-1 | 1.0 | 9 | 0.65 | 0.002 | ○ | 0.4% |
| Test Example 3-2 | 4.0 | 5 | 0.55 | 0.002 | ○ | 0.4% |
| Test Example 3-3 | 6.0 | 4.5 | 0.55 | 0.002 | ○ | 0.4% |

Test Example 4

Test for Effect of S1/S2

The same undried honeycomb formed body as that of Test Example 1-2 was produced. The undried honeycomb formed body was housed in the correction mold and dried to absolute dry under the same conditions as those of Test Example 1-2 with the exception that the ratio "S1/S2" was changed to the conditions shown in Table 4 by changing the inner cross-sectional area of the correction mold. For each dried honeycomb formed body, the "Cylindricity" and "Variation in Total Pore Volume" were determined by the same methods as those of Test Example 1-2. The results are shown in Table 4.

TABLE 4

| | S1/S2 | Cylindricity mm | Variation in Total Pore Volume cc/g | Heat Resistance Evaluation | Variation in Heat Exchange Performance | Remarks |
|---|---|---|---|---|---|---|
| Test Example 1-2 | 1.02 | 0.65 | 0.002 | ○ | 0.4% | |
| Test Example 4-1 | 0.94 | 1.2 | 0.002 | x | 0.4% | |
| Test Example 4-2 | 0.96 | 0.7 | 0.002 | ○ | 0.4% | |
| Test Example 4-3 | 0.98 | 0.65 | 0.002 | ○ | 0.4% | |
| Test Example 4-4 | 1.04 | 0.6 | 0.002 | ○ | 0.4% | |
| Test Example 4-5 | 1.06 | 0.6 | 0.002 | x | 0.4% | Generation of Deformation of Cells |

Test Example 5

Test for Effect of Dry-Bulb Temperature of Hot Gas

The same undried honeycomb formed body as that of Test Example 1-2 was produced. The undried honeycomb formed body was housed in the correction mold and dried to absolute dry under the same conditions as those of Test Example 1-2 with the exception that the dry-bulb temperature was changed to the conditions shown in Table 5. For each dried honeycomb formed body, the "Cylindricity" and "Variation in Total Pore Volume" were determined by the same methods as those of Test Example 1-2. The results are shown in Table 5.

TABLE 5

| | Dry-bulb Temperature (T3) ° C. | Drying Time to Absolute Dry min | Cylindricity mm | Variation in Total Pore Volume cc/g | Heat Resistance Evaluation | Variation in Heat Exchange Performance |
|---|---|---|---|---|---|---|
| Test Example 1-2 | 160 | 6 | 0.65 | 0.002 | ○ | 0.4% |
| Test Example 5-1 | 170 | 5.8 | 0.64 | 0.002 | ○ | 0.4% |
| Test Example 5-2 | 120 | 8 | 0.7 | 0.002 | ○ | 0.4% |
| Test Example 5-3 | 100 | 9 | 0.8 | 0.002 | x | 0.4% |

Test Example 6

Drying Test by Microwave Heating (Comparative Example)

The same undried honeycomb formed body as that of Test Example 1-2 was produced. The honeycomb formed body was housed in the correction mold under the same conditions as those of Test Example 1-2. This was placed in a microwave drying apparatus in the state where the honeycomb formed body was horizontally arranged so that the flow path direction of the cells was horizontal, and then dried under the conditions shown in Table 6. For each dried honeycomb formed body, the "Cylindricity" and "Variation in Total Pore Volume" were determined by the same methods as those of Test Example 1-2. The "Water Content after Drying" was determined by the loss on drying method. The results are shown in Table 6.

TABLE 6

|  | Output W | Drying Time min | Water Content after Drying g/g | Cylindricity mm | Variation in Total Pore Volume cc/g | Heat Resistance Evaluation | Variation in Heat Exchange Performance | Remarks |
| --- | --- | --- | --- | --- | --- | --- | --- | --- |
| Test Example 6-1 | 500 | 1.5 | 0.1 | 1.4 | 0.015 | x | 3.0% | Excessive Deformation of End Face |
| Test Example 6-2 | 250 | 3 | 0.13 | 1.2 | 0.012 | x | 2.4% |  |
| Test Example 6-3 | 250 | 12 | 0 | 1.3 | 0.012 | x | 2.4% |  |

Test Example 7

Test for Effect of Water Content after Drying

The same undried honeycomb formed body as that of Test Example 1-2 was produced. The undried honeycomb formed body was housed in the correction mold and dried to absolute dry under the same conditions as those of Test Example 1-2 with the exception that the drying time was changed to the conditions shown in Table 7. For each dried honeycomb formed body, the "Cylindricity" and "Variation in Total Pore Volume" were determined by the same methods as those of Test Example 1-2. The "Water Content after Drying" was determined by the loss on drying method. The results are shown in Table 7.

TABLE 7

|  | Drying Time min | Water Content after Drying g/g | Cylindricity mm | Variation in Total Pore Volume cc/g | Heat Resistance Evaluation | Variation in Heat Exchange Performance |
| --- | --- | --- | --- | --- | --- | --- |
| Test Example 1-2 | 6 | 0 | 0.65 | 0.002 | ○ | 0.4% |
| Test Example 7-1 | 5 | 0.03 | 0.6 | 0.002 | ○ | 0.4% |
| Test Example 7-2 | 4 | 0.07 | 0.65 | 0.003 | ○ | 0.6% |
| Test Example 7-3 | 3 | 0.1 | 0.65 | 0.006 | x | 1.2% |

Test Example 8

Test for Effect of S3/S4

The same undried honeycomb formed body as that of Test Example 1-2 was produced. In Test Examples 1 to 7, S3 equaled S4, in which S3 is the inner cross-sectional area of the upstream side end portion of the correction mold and S4 is the inner cross-sectional area of the downstream side end portion. In Test Example 8, the undried honeycomb formed body was housed in the correction mold and dried to absolute dry under the same conditions as those of Test Example 1-2 with the exception that the ratio "S3/S4" of the inner cross-sectional area of the upstream side end portion to the inner sectional area of the downstream side end portion of the correction mold and "Height of Honeycomb Formed Body" were changed to the conditions shown in Table 8. For each dried honeycomb formed body, the "Cylindricity" and "Variation in Total Pore Volume" were determined by the same methods as those of Test Example 1-2. The results are shown in Table 8.

TABLE 8

| | S3/S4 | Cylindricity mm | Height (L) of Honeycomb mm | Variation in Total Pore Volume cc/g | Heat Resistance Evaluation | Variation in Heat Exchange Performance |
|---|---|---|---|---|---|---|
| Test Example 4-4 | 1.00 | 0.60 | 165 | 0.002 | ○ | 0.4% |
| Test Example 8-1 | 0.98 | 0.52 | 165 | 0.002 | ○ | 0.4% |
| Test Example 8-2 | 0.96 | 0.52 | 165 | 0.002 | ○ | 0.4% |
| Test Example 8-3 | 0.94 | 0.59 | 165 | 0.002 | ○ | 0.4% |
| Test Example 8-4 | 0.92 | 0.63 | 165 | 0.002 | ○ | 0.4% |
| Test Example 8-5 | 0.90 | 0.70 | 165 | 0.002 | ○ | 0.4% |
| Test Example 8-6 | 1.02 | 0.67 | 165 | 0.002 | ○ | 0.4% |
| Test Example 8-7 | 1.00 | 0.75 | 200 | 0.002 | ○ | 0.4% |
| Test Example 8-8 | 0.98 | 0.65 | 200 | 0.002 | ○ | 0.4% |
| Test Example 8-9 | 0.96 | 0.62 | 200 | 0.002 | ○ | 0.4% |
| Test Example 8-10 | 0.94 | 0.64 | 200 | 0.002 | ○ | 0.4% |
| Test Example 8-11 | 0.92 | 0.72 | 200 | 0.002 | ○ | 0.4% |
| Test Example 8-12 | 0.90 | 0.78 | 200 | 0.002 | ○ | 0.4% |
| Test Example 8-13 | 1.02 | 0.80 | 200 | 0.002 | ○ | 0.4% |

<Test for Performance as Heat Exchanger Member>

Ten honeycomb formed bodies produced under the conditions described in the respective Test Examples were prepared, respectively. Each of them was processed, degreased, fired, and further oxidized to obtain a honeycomb structure. The degreasing was conducted in an oxidizing atmosphere at 550° C. for 3 hours. The firing was conducted in an argon atmosphere at 1450° C. for 2 hours. The oxidation treatment was conducted in an oxidizing atmosphere at 1300° C. for 1 hour.

For each of the resulting honeycomb structures, the following heat resistance evaluation and heat exchange performance evaluation were carried out.

(1) Heat Resistance Evaluation

The heat resistance evaluation was carried out on five honeycomb structures for each Test Example. After each honeycomb structure was installed in an exhaust heat recovery device and 100 g/s of exhaust gas at 950° C. was allowed to pass through the exhaust heat recovery device for 30 minutes, the temperature was decreased, and the honeycomb structure was evaluated for whether or not the honeycomb structure had defects (cracks or the like) before and after increasing and decreasing the temperature. The case where no defect was found in all of the five honeycomb structures was evaluated as "O (a single circle)", and the case where at least one defect was observed was evaluated as "x (a cross)".

(2) Heat Exchange Performance Evaluation

Heat exchange performance evaluation was carried out on five honeycomb structures for each Test Example. A heat exchanger was assembled by covering each honeycomb structure with a casing having an inlet and an outlet for a heat exchange medium such that the heat exchange medium could flow on the outer side surface of each honeycomb structure. After installing the heat exchanger in the exhaust heat recovery device, the exhaust gas was allowed to flow through the exhaust heat recovery device. Then, the heat exchange performance in the case where water was used as the heat exchange medium was measured. The heat exchange performance was calculated from the following equation based on measurements of an amount of heat input flowing into the exhaust heat recovery device and an amount of recovered heat recovered by the exhaust heat recovery device.

Heat Exchange Performance (%)=Amount of Recovered Heat/Amount of Heat Input×100

For Each Test Example, the heat exchange performance was determined for the five honeycomb structures, and the difference between the maximum value and the minimum value of the measured values of the heat exchange performance was evaluated as the variation in heat exchange performance.

The results are shown in Tables 1 to 8. In Test Examples with poor cylindricity, the variation in thickness of the outer sidewall was larger, and cracks were generated during the heat resistance evaluation. Therefore, the honeycomb structures could not be used as a heat exchange member. Although the honeycomb structures having larger variation in the total pore volume do not affect the generation of cracks during the heat resistance evaluation, they have larger variation in the heat exchange performance for each product. Therefore, there is room for improvement in terms of stability of quality. In contrast, the honeycomb structures having good cylindricity and good variation in the total pore volume generates no crack during the heat resistance evaluation and results in smaller variation in the heat exchange performance, so that they can be suitably used as a heat exchange member.

DESCRIPTION OF REFERENCE NUMERALS 1 honeycomb formed body
2 partition wall
3 cell
4 outer sidewall
5 first bottom surface
6 second bottom surface
101 correction mold
102 honeycomb formed body
103 hot gas generator
104 first bottom surface
105 second bottom surface
106 baffle plate
107 flow of hot gas
108 cell
109 outer sidewall
110 boundary portion
112 opening portion
114 circulation duct
116 blower
118 exhaust duct
120 intake duct

What is claimed is:

1. A method for drying at least one unfired columnar honeycomb formed body without microwave drying or dielectric drying, the honeycomb formed body comprising a raw material composition containing at least one raw material of ceramics, water and at least one heat-gelling binder, and comprising a plurality of cells comprising flow paths penetrating from a first end surface to a second end surface inside an outer sidewall, the cells being defined by partition walls, the method comprising a step of drying the honeycomb formed body by allowing hot gas satisfying $0.8 \leq T2/T1 \leq 3.3$ in which T1 represents a gelation temperature of the binder (° C.) and T2 represents a wet-bulb temperature of the hot gas (° C.), to pass through the flow paths of the plurality of cells such that the hot gas flows into the first end surface and flows out of the second end surface, while entirely surrounding an outer side surface of the honeycomb formed body by a correction mold comprising an inner side surface shape corresponding to the outer side surface shape of the honeycomb formed body, wherein during the step of drying the honeycomb formed body, at least a part of the outer side surface of the honeycomb formed body receives pressure from the inner side surface of the correction mold, whereby the honeycomb formed body is subjected to shape correction, and wherein the method comprises carrying out the step of drying the honeycomb formed body such that the hot gas passes through the flow paths of the cells at a gas velocity of 2.0 m/s or more.

2. The method for drying the at least one unfired columnar honeycomb formed body according to claim 1, wherein $T1 \leq T3$ is satisfied, in which T3 represents a dry-bulb temperature of hot gas (° C.), and T3 is lower than an initiation temperature of thermal decomposition of the binder.

3. The method for drying the at least one unfired columnar honeycomb formed body according to claim 1, wherein the method comprises carrying out the step of drying the honeycomb formed body while surrounding the outer side surface of the honeycomb formed body by the correction mold such that a ratio of an inner cross-sectional area S1 of the honeycomb formed body before carrying out the step of drying in a direction perpendicular to a flow path direction of the cells to an inner cross-sectional area S2 of the correction mold in the direction perpendicular to the flow path direction of the cells is $0.96 \leq S1/S2 \leq 1.04$.

4. The method for drying the at least one unfired columnar honeycomb formed body according to claim 1, wherein the method comprises carrying out the step of drying the honeycomb formed body while disposing on an upstream side of the first end surface a baffle plate for preventing the hot gas from entering a boundary portion between the outer side surface of the honeycomb formed body and the inner side surface of the correction mold.

5. The method for drying the at least one unfired columnar honeycomb formed body according to claim 4, wherein the baffle plate is arranged on the upstream side of the first end surface such that the baffle plate covers the outer sidewall of the honeycomb formed body, the boundary portion between the outer side surface of the honeycomb formed body and the inner side surface of the correction mold, and 5 to 30% of a number of all the cells from the cells arranged on an outermost periphery toward the cells on the inner side.

6. The method for drying the at least one unfired columnar honeycomb formed body according to claim 1, wherein a water content in the raw material composition is from 17.0% by mass to 26.0% by mass, based on 100% by mass of the at least one raw material of ceramics.

7. The method for drying the at least one unfired columnar honeycomb formed body according to claim 1, wherein the method comprising carrying out the step of drying the honeycomb formed body such that a water content in a dried honeycomb formed body is 0.07 g or less per 1 g of the dried honeycomb formed body.

8. The method for drying the at least one unfired columnar honeycomb formed body according to claim 1, wherein a relationship of $L/D \leq 15$ is satisfied, in which L represents a length of the honeycomb formed body in a flow path direction of the cells, and D represents a length of the honeycomb formed body in a direction perpendicular to the flow path direction of the cells.

9. The method for drying the at least one unfired columnar honeycomb formed body according to claim 1, wherein the outer sidewall of the honeycomb formed body has a thickness of 0.2 mm or more.

10. The method for drying the at least one unfired columnar honeycomb formed body according to claim 1, wherein the correction mold is configured of a pair of half members that are divided along a flow path direction of the cells.

11. The method for drying the at least one unfired columnar honeycomb formed body according to claim 1, wherein an inner cross-sectional area S2 of the correction mold in a direction perpendicular to a flow path direction of the cells is increased from a first end surface side toward a second end surface side.

12. The method for drying the at least one unfired columnar honeycomb formed body according to claim 1, wherein the step of drying the honeycomb formed body comprises allowing the hot gas to pass through the flow paths of the plurality of cells maintained in a negative pressure state.

13. The method for drying the at least one unfired columnar honeycomb formed body according to claim 12, wherein in the step of drying the honeycomb formed body, a gas volume of the hot gas flowing out of the second end surface of the honeycomb formed body is higher than a gas volume of the hot gas flowing into the first end surface of the honeycomb formed body.

14. The method for drying the at least one unfired columnar honeycomb formed body according to claim 1, wherein the step of drying the honeycomb formed body comprises circulating at least a part of the hot gas flowing out of the second end surface of the honeycomb formed body to utilize the hot gas as a part or all of the hot gas flowing into the first end surface of the honeycomb formed body.

15. The method for drying the at least one unfired columnar honeycomb formed body according to claim 14, wherein:

the hot gas is generated by heating a drying gas supplied by a blowing fan with a heater, a path of the hot gas flowing out of the second end surface of the honeycomb formed body is in communication with a path of the drying gas at a confluence on an upstream side of the blowing fan via a circulation path, and valves are arranged in the path of the drying gas and in the path of the hot gas flowing out of the second end surface of the honeycomb formed body, respectively.

16. The method for drying the at least one unfired columnar honeycomb formed body according to claim 1, wherein the method comprises, during the step of drying the honeycomb formed body, reversing a direction of allowing the hot gas to pass through the flow paths of the plurality of cells such that the hot gas flows into the second end surface and flows out of the first end surface.

17. The method for drying the at least one unfired columnar honeycomb formed body according to claim 1, wherein the method further comprises, after the step of drying the honeycomb formed body, a step of cooling the honeycomb formed body by allowing cold gas in place of the hot gas to pass through the flow paths of the plurality of the cells, such that the cold gas flows into the first end surface and flows out of the second end surface.

18. The method for drying the at least one unfired columnar honeycomb formed body according to claim 17, wherein the step of cooling the honeycomb formed body comprises carrying out the step of cooling while closing a valve arranged in a path of the hot gas flowing into the first end surface of the honeycomb formed body and opening a valve arranged in a path of the cold gas flowing into the first end surface of the honeycomb formed body.

19. The method for drying the at least one unfired columnar honeycomb formed body according to claim 1,
wherein a path of the hot gas is branched into a plurality of branched paths that are in communication with the first end surfaces of a plurality of the honeycomb formed bodies, and
wherein the method comprises switching the hot gas flowing into the first end surfaces of the plurality of the honeycomb formed bodies by an opening and closing operation of valves arranged in each of the branched paths of the hot gas.

20. A method for producing a honeycomb structure made of ceramics, comprising:
kneading raw materials containing at least one raw material of ceramics, water, and at least one heat-gelling binder to obtain a mixture;
extruding the mixture to obtain an unfired columnar honeycomb formed body comprising a plurality of cells comprising flow paths penetrating from a first end surface to a second end surface in an inside of an outer sidewall, the cells being defined by partition walls;
subjecting the unfired columnar honeycomb formed body to the method for drying the at least one honeycomb formed body according to claim 1 to obtain a dried honeycomb formed body; and
firing the dried honeycomb formed body.

* * * * *